(12) United States Patent
Morita et al.

(10) Patent No.: US 7,826,792 B2
(45) Date of Patent: Nov. 2, 2010

(54) COMPOSITE APPARATUS AND METHOD OF CHANGING ASSIGNMENT OF FUNCTION OF OPERATION BUTTON OF REMOTE CONTROLLER OF DECODING DEVICE

(75) Inventors: Toru Morita, Tokyo (JP); Shigeru Enomoto, Kanagawa (JP); Shunsuke Kunieda, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 1361 days.

(21) Appl. No.: 11/050,078

(22) Filed: Feb. 2, 2005

(65) Prior Publication Data

US 2005/0212979 A1    Sep. 29, 2005

(30) Foreign Application Priority Data

Feb. 5, 2004    (JP) ............................ P2004-028874

(51) Int. Cl.
  *H04H 7/00*    (2006.01)
(52) U.S. Cl. ...................................... 455/3.06; 345/169
(58) Field of Classification Search ................. 345/169; 340/825.72; 455/3.06, 419; 348/14.05, 114, 348/211.99, 734
  See application file for complete search history.

(56) References Cited

U.S. PATENT DOCUMENTS 5,607,357 A * 3/1997 Kim et al. ..................... 463/40
6,565,440 B2 * 5/2003 Hames .......................... 463/39
7,003,598 B2 * 2/2006 Kavanagh ..................... 710/62
7,231,607 B2 * 6/2007 Neely et al. .................. 715/747

FOREIGN PATENT DOCUMENTS

| JP | 2000-187554 | 7/2000 |
|----|-------------|--------|
| JP | 2000-197162 | 7/2000 |
| JP | 2001-352497 | 12/2001 |
| JP | 2002-209282 | 7/2002 |
| JP | 2004028874  | 1/2004 |

* cited by examiner

*Primary Examiner*—Nay A Maung
*Assistant Examiner*—Angelica M Perez
(74) *Attorney, Agent, or Firm*—K & L Gates LLP

(57) ABSTRACT

A composite apparatus and associated methods are provided. The composite apparatus has a first function device section, a second function device section, and a remote controller section for remotely controlling the first function device section and the second function device section. An operation button double assigned with a remote control function of a specific second function group of other operation button, in the operation button group of the first function device section of the remote controller for remote control, the remote controlling function assigned to the operation button can be changed to further another remote controlling function. When a plurality of controlling functions are set to be switchable, all the plurality of the controlling functions are made to be available, for the operation button of the remote controller.

12 Claims, 11 Drawing Sheets

COMPOSITE APPARATUS AND METHOD OF CHANGING ASSIGNMENT OF FUNCTION OF OPERATION BUTTON OF REMOTE CONTROLLER OF DECODING DEVICE

CROSS REFERENCE TO RELATED APPLICATIONS

The present application claims priority to Japanese Document No. P2004-028874 filed on Feb. 5, 2004, the disclosure of which is incorporated herein by reference.

BACKGROUND OF THE INVENTION

The present invention relates to an apparatus for combining a reproducer section for reproducing contents stored in, for example, a hard disc, a DVD (Digital Versatile Disc), a CD (Compact Disc), or the like and a game unit section for performing a computer game, and more particularly to a change of a function assigned to an operation button of a remote controller section belonging to the composite apparatus.

Media for providing contents of an image or music is diversified, and contents to be provided become to have wide variety of types and a large quantity. As an apparatus for reproducing the contents, so called multimedia reproducer, which can reproduce the contents of such various types of media has been proposed. See, for example, Jpn. Pat. Appln. Laid-Open Publication No. 11-73428.

As such a multimedia reproducer, a composite apparatus combined with a game unit is sold in the market. In this composite apparatus, in order to allow the function of a game unit section to be easily operated, an operation controller for the game unit is attached, and in order to allow the function of the reproducer section to be easily operated, a remote commander is attached as well.

To be utilized as the remote commander of the reproducer section, the operation controller for the game unit section is assigned with the function of the operation button. Further, the remote commander has an operation button group corresponding to each operation button of the operation controller for the game unit section. The functions of these operation buttons have entirely equal functions to those of the operation button of the operation controller for the game unit section. Therefore, both the operation controller for the game unit section and the remote commander are operated as the remote controller section of the composite apparatus.

However, when a new function is intended to be added to the above-mentioned composite apparatus, it is necessary for the operation button for starting the additional function to be provided in the operation controller and the remote commander. In this case, as described above, the remote commander of the composite apparatus already has many buttons such as the operation button group for the game unit section. It is not preferred to further add the operation button. It is not preferable to install a new operation button to the operation controller for the game unit section, because an operation controller different from the aforementioned operation controller must be created.

Further, purchase of new operation controller and a remote commander is requested for a user who has already purchased the composite apparatus to add the new additional functions, which causes a problem for the user to be forced to the economical load.

Therefore, it is considered to realize switchably setting of new functions and the original functions in a specific operation button of the remote commander. According to this method, new functions can be started without increasing the new operation button.

However, in this case, the operation button in which two functions can be switchably set has a problem that either the original functions or the new functions can be started.

SUMMARY OF THE INVENTION

The present invention relates to an apparatus for combining a reproducer section for reproducing contents stored in, for example, a hard disc, a DVD (Digital Versatile Disc) or a CD (Compact Disc), etc. and a game unit section for performing a computer game, and more particularly to a change of a function assigned to an operation button of a remote controller section belonging to the composite apparatus.

The present invention provides in an embodiment a composite apparatus which can solve the above-mentioned problem. The composite apparatus includes: a first function device section, a second function device section, and a remote controller section for remotely controlling the first function device section and the second function device section, wherein the remote controller section has an operation button group for remotely controlling the first function device section, and an operation button group for remotely controlling the second function device section, at least part of the operation button group for remotely controlling the first function device section is also assigned to the operation button for remotely controlling the second function device section, and a remote control function of a specific second function device section is double assigned as the operation button for remotely controlling the first function device section that is also assigned to the operation button for remotely controlling the second function device section, and assigned remote control function of the operation button to which the remote control function of the specific second function device section of the operation button group for remotely controlling the first function device section of the remote controller is double assigned to the other operation button is further changeable in the assignment to another remote control function.

According to the invention in an embodiment of the above-mentioned structure, other controlling function is switched, set and changed to be assigned to the operation button to which the controlling function of reproducing doubled with the other operation button of the operation buttons of the remote controller of the composite apparatus. Since the controlling function before changing of the operation button in which the assigned controlling function is changed, is double assigned to the other operation button, a case that the controlling function before the change cannot be started, does not take place.

According to the present invention, since the one controlling function of the operation button in which two functions can be switchably set is double assigned to the other operation button, the disadvantage can be avoided that only one of the two switchable functions is started.

Additional features and advantages of the present invention are described in, and will be apparent from, the following Detailed Description of the Invention and the figures.

DETAILED DESCRIPTION OF THE INVENTION

The present invention relates to an apparatus for combining a reproducer section for reproducing contents stored in, for example, a hard disc, a DVD (Digital Versatile Disc), a CD (Compact Disc), or the like and a game unit section for performing a computer game, and more particularly to a change of a function assigned to an operation button of a remote controller section belonging to the composite apparatus.

An embodiment of a composite apparatus according to the present invention will be described with reference to the accompanying drawings. The embodiment to be described below is the case that the composite apparatus of the present invention is applied to a multimedia recorder/reproducer having functions of a television game unit, television broadcasting receiving and recording functions, recording/reproducing functions of a DVD (Digital Versatile Disc) or the like.

In the description to be described below, contents are content information which can be visually or auditorily recognized by a person, such as musical song of a music expressed by a signal, an image, such as, moving image, static image, and the like character data of an electronic novel, game software, and the like.

Further, media denote a recording medium of information, such as a hard disc, optical disc, memory card, magnetic tape, and the like, or a transmission medium of information, such as a radio wave, cable, and the like. Even when storage medium or the transmission medium of game media, and the like, is the same, a data format or a compression type is different, these media should be distinguished as different media.

<Structure of Multimedia Recording/Reproducing System>

Figure 2:
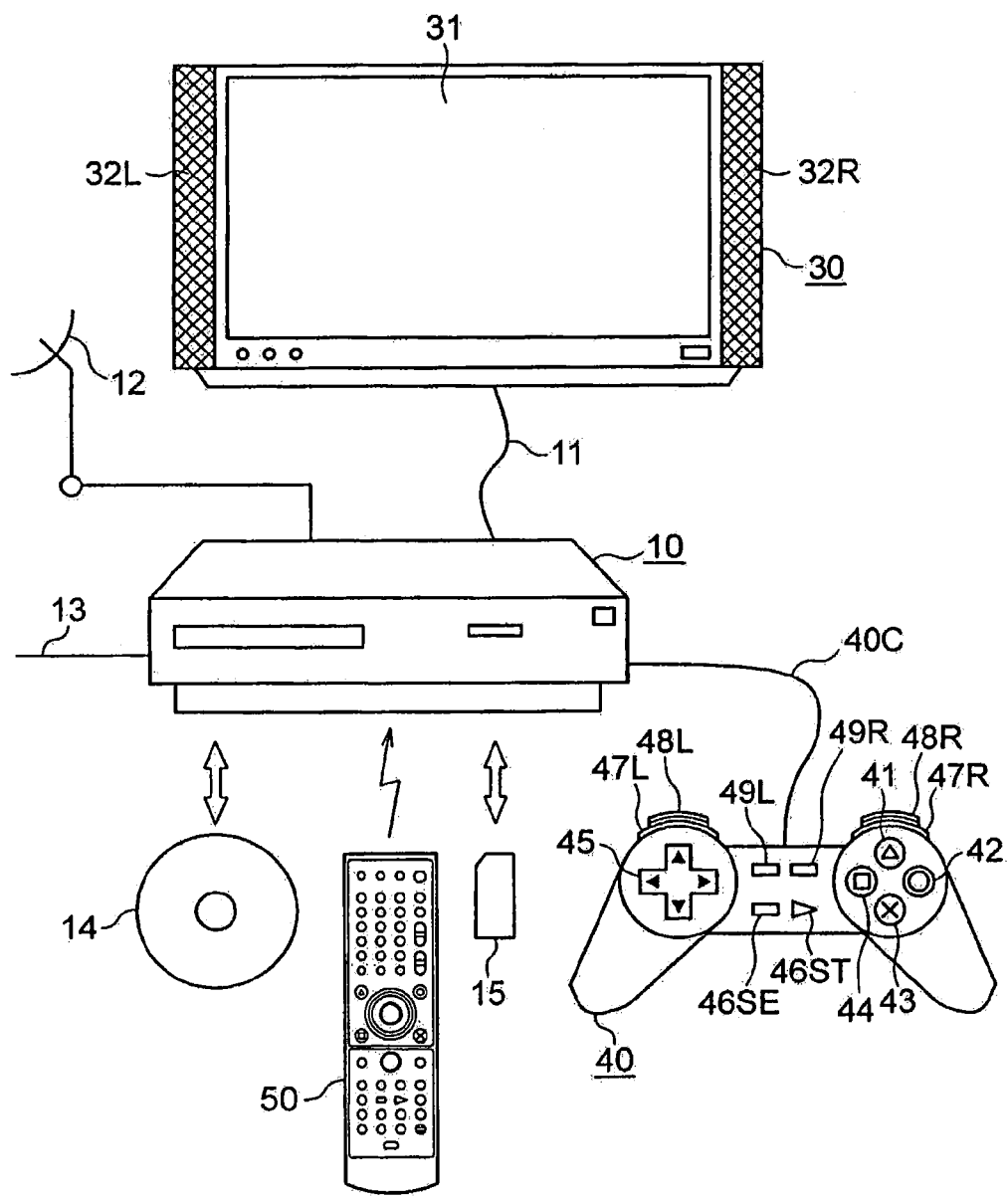
FIG. 2 is a view showing a structure example of a multimedia recording/reproducing system including an embodiment of the present invention.

FIG. 2 shows a fundamental structure of a multimedia recording/reproducing system including a multimedia recorder/reproducer 10 to which this embodiment is applied.

The multimedia recorder/reproducer 10 of this embodiment does not include a display for displaying a video or a graphic user interface screen, and includes, instead, a video output terminal (not shown). The video output terminal of the multimedia recorder/reproducer 10 is connected to a monitor display 30 having, for example, a CRT (Cathode Ray Tube), an LCD (Liquid Crystal Display), and the like through a connection cable 11. A screen 31 of this monitor display 30 is used for video display and user interface screen display.

In an example of FIG. 2, the monitor display 30 has speakers 32L, 32R at both left and right ends, to which voice signals of the voice output terminal of a multimedia recorder/reproducer 20 are supplied to the monitor display 30 through a cable (not shown), and acoustically reproduced.

Information of the contents is inputted to the multimedia recorder/reproducer 10 through a plurality of types of media, such as, broadcasting, the Internet, an optical disc, such as a DVD, a CD (Compact disc), and the like, a memory card and the like.

Here, broadcasting media will be described. In this example, a television broadcasting receiving antenna 12 is connected to the multimedia recorder/reproducer 10, and a television broadcasting signal received by the antenna 12 is supplied to the multimedia recorder/reproducer 10. In the multimedia recorder/reproducer 10, broadcasting program contents selected by a user from the television broadcasting signal are extracted and decoded, broadcasting program video is displayed on the screen of the monitor display 30, and the voices of the broadcasting program are acoustically reproduced by speakers 32L, 32R of the monitor display 30. Further, the multimedia recorder/reproducer 10 also has a function of recording the broadcasting program contents.

The Internet media will be described. In the multimedia recorder/reproducer 10, a communication channel 13 for connecting to the Internet is connected, and data of web contents acquired through the internet are input to the multimedia recorder/reproducer 10. The data of the web contents can be stored in the multimedia recorder/reproducer 10, and can be used in various types of functions, such as a game function, etc., of the multimedia recorder/reproducer 10.

The optical disc media will be described. The multimedia recorder/reproducer 10 has a reading function of data of the contents stored in the optical disc 14, such as a DVD, a CD, and the like, decodes the read data, supplies the data to the monitor display 30 for viewing and hearing. The multimedia recorder/reproducer 10 also has functions of storing the moving image data and the voice data of the video contents read from the DVD and the data of music contents read from the CD.

Contents stored in an optical disc include, for example, a video, music and voice of a movie, a musical composition, such as, a classical music, popular music, and an electronic novel. Contents data of the electronic novel include character data, voice data of a reading, image data, such as, illustrations, and so on.

As to the memory card media, the multimedia recorder/reproducer 10 has functions of reading and writing data stored in the memory card 15. As the data of the contents stored in the memory card 15, there are voice information attached to the photographed image of the moving image or static image photographed by a digital camera, which can be stored in a data storage unit of the multimedia recorder/reproducer 10.

The multimedia recorder/reproducer 10 of this example not only has the recording/reproducing functions of the above-mentioned multimedia, but also has a function of a game unit. The operation controller 40 mainly controls a game unit section of the multimedia recorder/reproducer 10, and connected to the multimedia recorder/reproducer 10 through a connection cable 40C. The operation controller 40 is adapted to be used for controlling the recording/reproducing multimedia.

The operation controller 40 in this example is used mainly for an operation controller of the game unit section, and constituted as same as the operation controller for the conventional game unit, which has comparatively small number of operation buttons. In the embodiment of FIG. 2, there are provided four operation buttons 41, 42, 43, and 44 provided at vertexes of a rhombic shape, a cross type direction indication button 45, a start button 46ST, a select button 46SE, Li button 47L, R1 button 47R, L2 button 48L and R2 button 48R, L3 button 49L, R3 button 49R provided at the side of the operation controller 40.

Specific signs (marks) are displayed in this example on the surfaces of the pressing parts of the four operation buttons 41, 42, 43, and 44, and round marks, triangular marks, square marks, x marks, and the like are displayed in the example of FIG. 2 by printing and the like. As will be described later, these four operation buttons 41, 42, 43 and 44 the start button 46ST, and the select button 46SE are previously determined to correspond to specific operation items in the graphic user interface displayed on the display screen of the monitor display 30.

Particularly, the same signs as the signs displayed on these operation buttons 41, 42, 43 and 44 are displayed in the operation items in the graphic user interface corresponding to the four operation buttons 41, 42, 43 and 44 as will be described later so that the correspondence of operation buttons to the operation items are understood at a glance.

If the button of the operation controller 40 is operated by a user when the graphic user interface is displayed on the screen of the monitor display 30, the button operation is adapted to be reflected on the graphic user interface screen.

The operation controller 40 is adapted to be used for remotely controlling the recording/reproducing functions of the multimedia of the multimedia recorder/reproducer 10. When the operation controller 40 is used in the case of remotely controlling the recording/reproducing functions of the multimedia, the L1 button 47L and the R1 button 47R are assigned to be operated as a cueing function button of the forward direction and a cueing function button of the backward direction, and the L2 button 48L and the R2 button 48R are assigned to be operated as the function buttons of searching (fast forward reproducing) of the forward direction and the searching (rewinding reproducing) of the backward direction.

Further, the operations of the leftward direction and the rightward direction of the cross type directional indication button 45 of the operation controller 40 are operations to start functions of searching (fast forward reproducing) of the forward direction and searching (rewinding reproducing) of the backward direction.

Therefore, in the operation controller 40, the functions of searching (fast forward reproducing) of the forward direction and searching (rewinding reproducing) of the backward direction are double assigned to the L2 button 48L and the R2 button 48R and the operation button sections of the leftward direction and the rightward direction of the cross type directional indication button 45.

In this embodiment, in addition to the operation controller 40 for the game unit section, the remote commander 50 is provided as the remote controller section which can control the functions of the entirety of the multimedia recorder/reproducer 10. This remote commander 50 is a radio remote controller using an infrared ray in this example.

Figure 1:
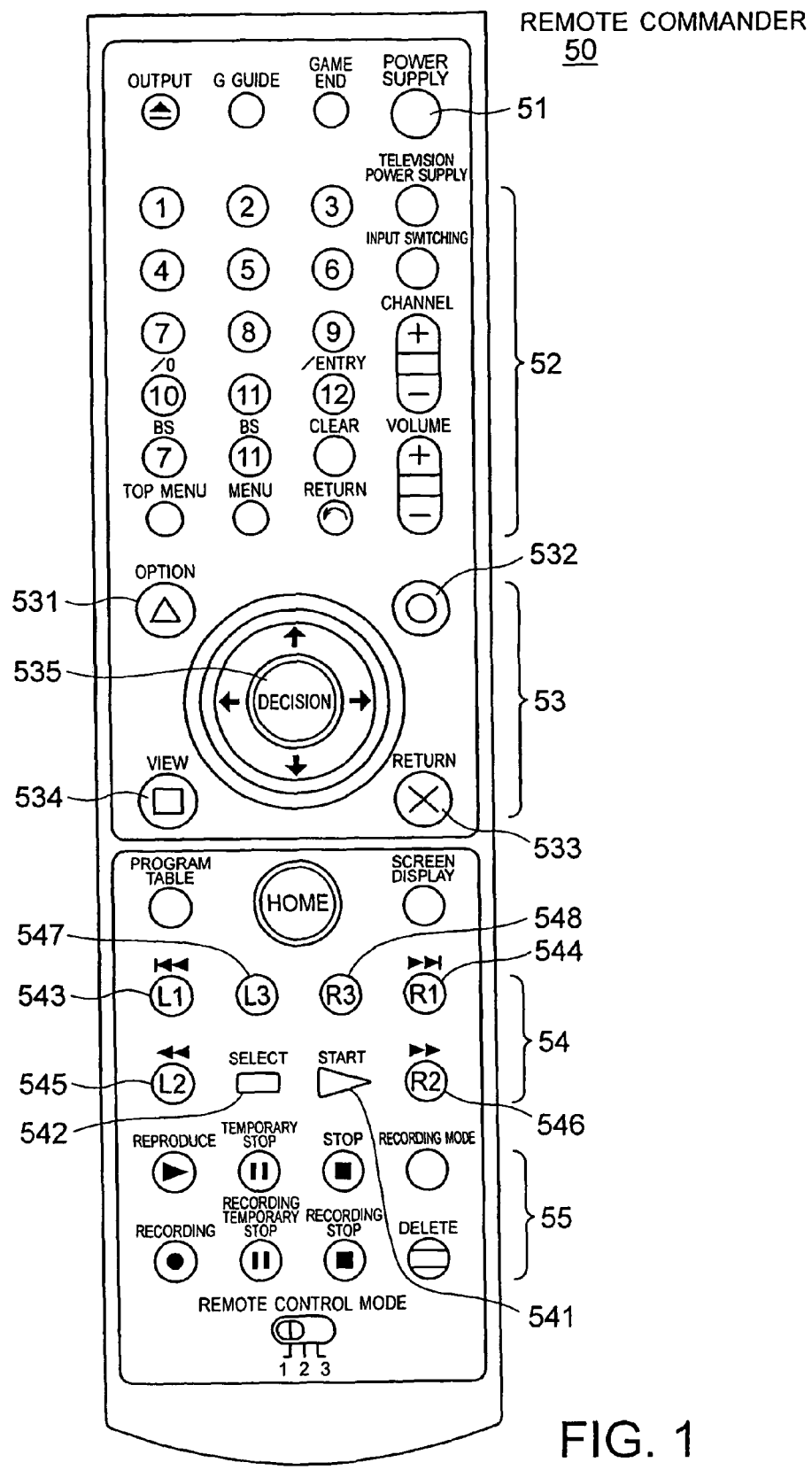
FIG. 1 is a view showing an example of a remote commander for constituting an embodiment of a composite apparatus according to an embodiment of the present invention.

FIG. 1 shows an example of an arraying layout of the operation button group of the remote commander 50 of this example.

As shown in FIG. 1, the remote commander 50 of this example has a power supply button 51, an operation button group 52 for selecting a broadcasting reception, operation button groups 53 and 54 for a game unit section, an operation button group 55 for controlling recording/reproducing, and a plurality of the other operation buttons.

The operation button group 52 for selecting the broadcasting reception has an operation button for directly selecting a channel of a broadcasting program, an operation button for channel up or down selecting, an operation button for controlling a sound volume, etc.

The operation button groups 53 and 54 are operation button groups corresponding one by one to the respective operation buttons of the operation controller 40. The operation buttons 531, 532, 533, and 534 of the operation button group 53 are operation buttons corresponding to the operation buttons 41, 42, 43 and 44 of the operation controller 40, and the same signs attached to the surfaces of the pressing parts of the operation buttons 41, 42, 43 and 44 are attached to the surfaces of the pressing parts of the operation buttons 531, 532, 533 and 534, that is, round marks, triangular marks, square marks, x marks are displayed by printing, etc.

An operation button 535 of the operation button group 53 corresponds to a cross type direction indication button 45 of the operation controller 40. This operation button 535 is in a joystick-like shape. In this example, as shown by arrows in FIG. 1, the operation button 535 can be operated in four directions of upward, downward, leftward and rightward directions, and can be pressed in meaning of a decision operation alike the operation button of the operation controller 40. Therefore, the operations of leftward and rightward directions of this operation button 535 are performed when the multimedia recorder/reproducer 10 is operated as a recorder/reproducer, and in the reproducing mode, are functions of controlling the starting of the searching (fast forward reproducing) of the forward direction and the searching (rewinding reproducing) of the backward direction.

The operation buttons 541, 542, 543, 544, 545, 546, 547, and 548 of the operation button group 54 respectively correspond to operation buttons 46ST, 46SE, 47L, 47R, 48L, 48R, 49L and 49R of the operation controller 40. Therefore, the operation buttons 543, 544 of the L1 button 47L and R1 button 47R are assigned to be operated as a cueing control function button of the forward direction and a cueing control function button of the backward direction, and the operation buttons 545, 546 corresponding to the L2 button 48L and R2 button 48R are assigned to operate as the control function button of the searching (fast forward reproducing) of the forward direction and the searching (rewinding reproducing) of the backward direction.

Therefore, even in the remote commander 50, the functions of the searching (fast forward reproducing) of the forward direction and the searching (rewinding reproducing) of the backward direction are double assigned, similarly to the operation controller 40, to the operation button 535 and the operation buttons 545, 546.

Operation Button Assigned to a Plurality of Functions

In this embodiment, the functions of the searching (fast forward reproducing) of the forward direction and the searching (rewinding reproducing) of the backward direction at the time of reproducing mode as described above, are double assigned, as remote controlling functions, to the cross type direction indication button 45, the L2 button 48L and R2 button 48R of the operation controller 40.

Correspondingly, in the remote commander 50, the functions of the searching (fast forward reproducing) of the forward direction and the searching (rewinding reproducing) of the backward direction are double assigned, similarly in the operation button 535 of the operation button group 53 and the operation buttons 545 and 546 of the operation button group 54.

In this embodiment, in the operation controller 40 and the remote commander 50, the remote controlling functions are double assigned to the operation buttons in this manner. Meanwhile, in the L2 button 48L and the R2 button 48R, the L2 operation button 545 and the R2 operation button 546, either one of the two controlling functions of the control function of the searching (fast forward reproducing) of the forward direction and the searching (rewinding reproducing) of the backward direction and the jumping function named "flashing" is assigned switchably by the user.

Here, the function named "flashing" is a function of jumping to a reproducing position before or after a predetermined time when the operation button assigned with the function is pressed. For example, when the L2 button 48L or the L2 operation button 545 is once pressed during reproducing, the present reproducing position is jumped to a reproducing position of 13 seconds before. Also, when the L2 button 48L or the L2 operation button 545 is continuously pressed twice, the present reproducing position is jumped to a reproducing position of (13 sec.+15 sec.=28 sec.) before from the present reproducing position, and when continuously pressed three times, the present reproducing position is jumped to a reproducing position of (13 sec.+15 sec.+15 sec.=43 sec) before from the present reproducing position. That is, when the L2 button 48L or the L1 operation button 545 is pressed continuously n times (n is an integer number of 1 or more), the reproducing position is jumped to a reproducing position of (13 sec.+15×(n−1)) before from the present reproducing position.

Further, when the R2 button 48R or the R2 operation button 546 is operated continuously n times, the reproducing position is jumped to a reproducing position of (13 sec.+15×(n−1)) after from the present reproducing position.

This "flashing" function fundamentally makes, when the operation button is operated n times, the reproducing position jump to a reproducing position of before or after 15×n sec. In this example, the reason why not 15 seconds but 13 seconds is assigned to the initial operation of the operation button is because since the operation button is operated while observing, for example, the reproducing screen, the operation delay of the user operation button to the timing desired to be actually jumped is considered.

Setting of assigning any of the reproducing controlling function to the L2 button 48L and the R2 button 48R, the L2 operation button 545 and the R2 operation button 546, is, as will be described later, executed through the graphic user interface to be displayed on the monitor display 30 by the multimedia recorder/reproducer 10 in response to the operation of the operation controller 40 or the remote commander 50.

<Structure of Multimedia Recorder/Reproducer 10>

Figure 3:
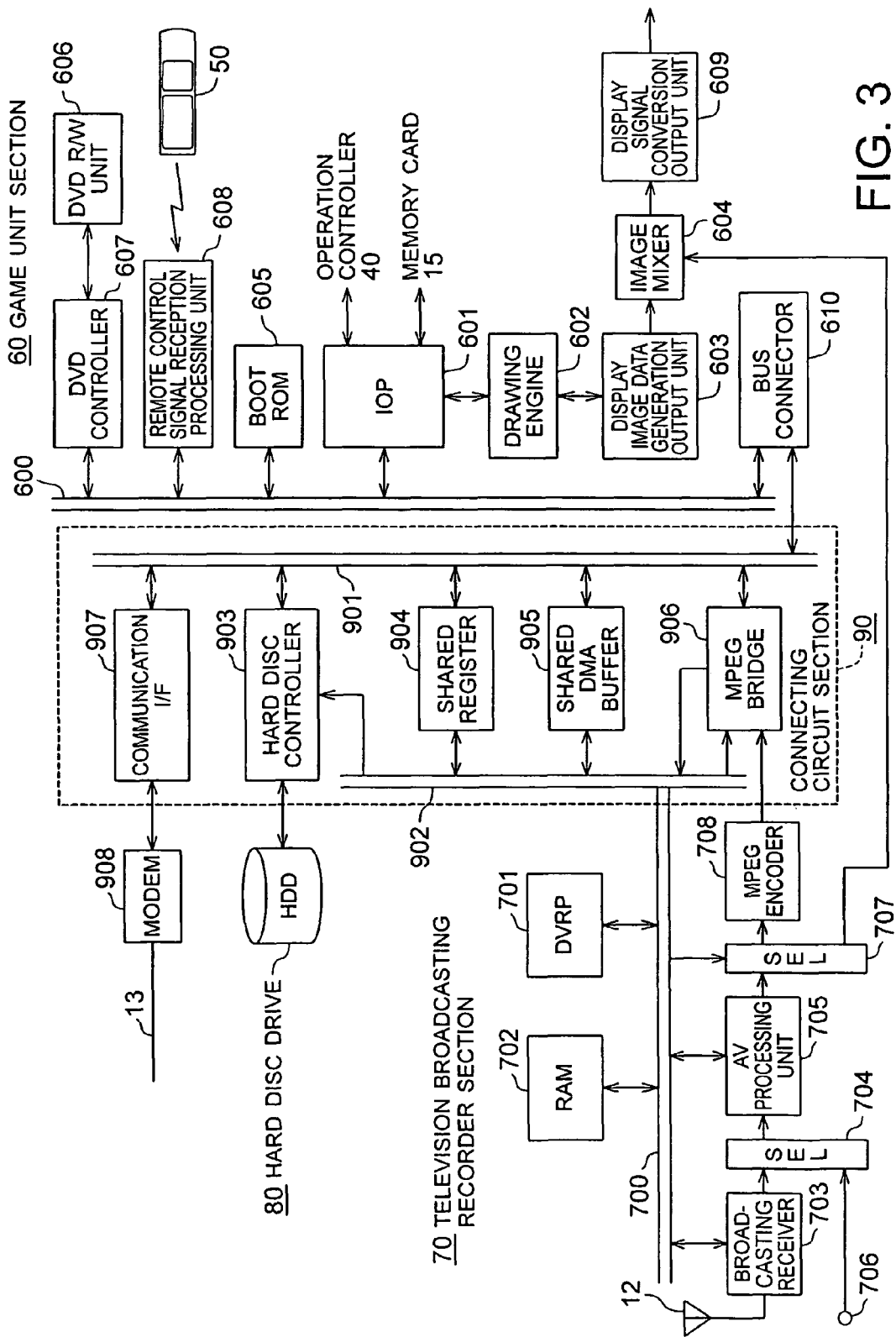
FIG. 3 is a block diagram showing a structure example of a multimedia recorder/reproducer as an example of the composite apparatus according to an embodiment of the present invention.

FIG. 3 is a view showing a hardware configuration of an essential portion of the multimedia recorder/reproducer 10 as an example of a multi-system of this embodiment. Note that, for the simplicity of description, audio signal system is omitted in this example shown in FIG. 3.

The multimedia recorder/reproducer 10 of this embodiment includes a game unit section 60 as an example of an information processing unit section, a television broadcasting recorder section 70 as an example of an information recorder section, a hard disc unit (hard disc driver) 80 as an example of a data storage unit, and a connecting circuit section 90 for connecting these game unit section 60, the television broadcasting recorder section 70 and the hard disc unit 80.

Game Unit Section 60

In the multimedia recorder/reproducer 10 of this example, in order to take precedence over compatibility with a conventional art, its structure is substantially the same as a conventional structure in a hardware manner. Further, an I/O interface section of a DVD driver section and a memory card 15, and an operation controller 40, a receiver of a remote control signal are provided in this game unit section 60.

In this game unit section 60, a processor (hereinafter called "IOP"9) 601 for constituting a microcomputer, a boot ROM (Read Only Memory) 605, a DVD controller 607, and a remote control signal reception processing unit 608 are connected to a bus 600.

A DVD read/write unit 606 is connected to the DVD controller 607. In the multimedia recorder/reproducer 10 of this embodiment, a game software is recorded in the boot ROM 605 and provided. A program for starting the game software (game program) is written in the boot ROM 605. Further, in this embodiment, a DVD which records contents, etc. of a movie is reproducible, and a television broadcasting program can be recorded in a recordable DVD.

The remote control signal reception processing unit 608 has, for example, a microcomputer, and an infrared photoreceiver for receiving an infrared remote control signal from the remote commander 50. When the remote control signal reception processing unit 608 receives an infrared remote control signal from the remote commander 50, the remote control signal reception processing unit 608 judges which operation button the remote control signal is generated by pressing, and generates a control signal in response to the controlling function assigned to the judged operation button, and sends the control signal to the bus 600. This control signal is sent to the IOP 601, interpreted, and a process in response to this control signal is executed by the IOP 601.

The remote control signal reception processing unit 608 has a memory (not shown) for storing a corresponding table (hereinafter referred to as a "remote control conversion correspondence table") of the operation button of the remote commander 50 and the controlling function assigned to the operation button, and the controlling function corresponding to the operation button judged from the received remote control signal is judged by referring to the remote control conversion correspondence table of the memory.

More particularly, the remote control conversion correspondence table is a correspondence table of the operation button and the controlling function assigned to the operation button. In this embodiment, since the controlling function assigned to the operation button of the remote commander 50 is different between a mode when the multimedia recorder/reproducer 10 operates as a game unit and a mode when the recorder/reproducer 10 operates as the recorder/reproducer, different remote control conversion correspondence tables are prepared for the mode operating as the game unit and the mode operating as the recorder/reproducer.

The remote control signal reception processing unit 608 judges the present mode state, and switches in response to the judged result. The remote control signal reception processing unit 608 judges the present mode according to information from the IOP 601.

A drawing engine 602 is connected to the IOP 601, and an interface for the operation controller 40 and the memory card 15 is connected. When the IOP 601 receives an operation signal from the operation controller 40, the IOP 601 judges which operation button the operation signal is generated by pressing, generates a control signal in response to the controlling function assigned to the judged operation button, and sends the control signal to the bus 600.

The IOP 601 has an operation button (not shown) of the operation controller 40, and a memory for storing the conversion correspondence table with the controlling function assigned to the operation button, and judges the controlling function corresponding to the operation button judged from the operation signal received from the operation controller 40 by referring to the conversion correspondence table of the memory.

The conversion correspondence tables provided in this IOP 601 which are different between a mode for the multimedia recorder/reproducer 10 to operate as a game unit and a mode for the multimedia recorder/reproducer 10 to operate as a recorder/reproducer, are prepared. The IOP 601 judges the present mode state, and switches the conversion correspondence table in response to the judged result.

The drawing engine 602 processes to generate drawing data, such as a drawing command based on a game software, or to generate graphic user interface screen data in response to user's operation input through the remote commander 50. The drawing engine 602 also has a function of decoding image data compression coded by an MPEG (Moving Picture Experts Group) system recorded in the DVD or an MPEG compression coded image data stored in a hard disc unit 80. The drawing engine 602 is also a CPU for running an application.

The drawing data, and the like based on the game software from the drawing engine 602 is supplied to a display image data generation output unit 603. The display image data generation output unit 603 generates display image data for displaying on a display 30 based on the drawing data. The display image data from the display image data generation output unit 603 is sent to the display 30 through an image mixer 604 and a display signal conversion output unit 609.

In case that the DVD records not a game software but movie contents or the like, decoded data of movie contents data compression coded under the control of the IOP 601 is obtained from the drawing engine 602, this decoded data is formed as reproduced image data of the movie contents by the display image data generation output unit 603, and supplied to the display 30 through the image mixer 604 and the display signal conversion output unit 609.

The drawing data for generating graphic user interface screen generated in response to the control command from the IOP 601 by the drawing engine 602 is sent to the image mixer 604 through the display image data generation output unit 603. As will be described later, the drawing data is mixed with image data, such as television broadcasting program, etc., from the television broadcasting recorder section 70 by α (alpha) blending, and a graphic user interface screen is displayed by superposing in a semi-transparent state on the image of the television broadcasting program from the television broadcasting recorder section 70.

Here, the α blending is called an "image mixing method" adapted to display by superposing another image in a semi-transparent state on a certain display image. Two image data are mixed at a designated mixing ratio $\alpha(0 \leq \alpha \leq 1.0)$, and superposed and displayed in the degree of semi-transparency in response to the designated mixing ratio α.

The IOP 601 judges the user input inputted by operating the remote commander 50 through this graphic user interface, and when a process in response to the user input relates to the television broadcasting recorder section 70, the IOP 601 has a function of transferring its command to the television broadcasting recorder section 70 through the connecting circuit section 90.

Further, the IOP 601 has, as will be described later, a function for recording television broadcasting program contents to DVDs.

A bus connector 610 connects the bus 901 of the connecting circuit section 90 to be described later to the bus 600 of the game unit section 60 to form a so-called fire wall which is provided to prevent illegal access from the connecting circuit section 90 side to the game unit section 60.

Television Broadcasting Recorder Section 70

In the television broadcasting recorder section 70, a processor (hereinafter abbreviated as a "DVRP") 701 for constituting a microcomputer and a work RAM 702 are connected to a bus 700.

A television broadcasting receiver 703 selects a broadcasting program in response to a user's channel selecting operation inputted through the remote commander 50 from a television signal received by the antenna 12, and sends the broadcasting program to an AV (Audio Visual) processing unit 705 through a selecting circuit 704. Incidentally, the remote control signal from the remote commander 50 is received by the remote control signal reception processing unit 608, transferred to the bus 700 through the connecting circuit section 90 (shared register 908), and processed for controlling to channel selection by the DVRP 701 or controlling the AV signal. The control signal from the remote control signal reception processing unit 608 is once sent to the IOP 601, the IOP 601 interprets the control signal, and transfers the control signal to the bus 700 through the connecting circuit section 90.

The image data and audio data from an external input terminal 706 are supplied to the AV processing unit 705 through the selecting circuit 704. The selecting circuit 704 is switched in response to a selecting operation through the operation controller 40 in the graphic user interface displayed on the screen of the remote commander 50 or the monitor display 30. Information inputted through the remote commander 50 or the operation controller 40 and of the selecting operation sensed by the remote control signal reception processing unit 608 or the IOP 601 is transferred to the bus 700 through the shared register 908 of the connecting circuit section 90, then received and processed by the DVRP 701.

The AV processing unit 705 reproduces the video signal and the voice signal of the television broadcasting program contents. The reproduced video signal and voice signal are supplied to the selecting circuit 707. When the selecting circuit 707 is selectively controlled by the DVRP 701 and the television broadcasting program contents are recorded, the television broadcasting program contents are supplied to an MPEG (Moving Picture Exerts Group) encoder 708.

In the MPEG encoder 708, the video signal and the voice signal are compression coded, and the compression coded data is recorded in a hard disc unit 80 under the control of the DVRP 701 through the connecting circuit section 90, or recorded in the DVD under the control of the IOP 601.

If the television broadcasting program contents and image data and audio data contents input through an external input terminal are not recorded but merely viewed and heard, the image data from the selecting circuit 707 is supplied to the monitor display 30 through the image mixer 604.

Connecting Circuit Section 90

Then, the connecting circuit section 90 will be described. This connecting circuit section 90 allows the IOP 601 of the game unit section 60 and the DVRP 701 of the television broadcasting recorder section 70 access together to the hard disc unit 80 and transfers a command in response to the user inputting operation accepted at the game unit section 60 from the game unit section 60 side to the television broadcasting recorder section 70.

Incidentally, in this embodiment, as described above, the television broadcasting recorder section 70 side can preferentially access the hard disc unit 80. That is, recording and reproducing of the contents of the television broadcasting program have preference.

The data storage area of the hard disc unit 80 is divided into several areas, and different areas are assigned to data recording area DV of the image data and the voice data of the television broadcasting program contents, etc. from the television broadcasting recorder section 70, and a data recording area 10 for the game unit section 60.

In this embodiment, in accessing of the hard disc unit 80 from the IOP 601, data is fundamentally read from the data recording area IO. At the recording/reproducing time of the image data and the voice data of the television broadcasting program, etc., the DVRP 701 accesses to the data recording area DV of the hard disc unit 80.

The connecting circuit section 90 has a bus 901 connected to the bus 600 of the game unit section 60 through the bus connector 610, and a bus 902 connected to the bus 700 of the television broadcasting recorder section 70, and further has a hard disc controller 903, a shared register 904, a shared DMA buffer 905, and an MPEG bridge 906. The hard disc controller 903, the shared register 904 and the shared DMA buffer 905 can be accessed from the bus 901 side by the IOP 601, and can be accessed from the bus 902 side by the DVRP 701.

The MPEG bridge 906 is selectively controlled by a selective control signal from the DVRP 701, and transfers the compressed data of the television broadcasting program contents from the MPEG encoder 708 to any of the bus 901 or the bus 902.

Furthermore, the modem 908 is connected to the bus 901, for example, through a communication interface 907. The modem 908 is connected to a telephone channel 13.

If the DVRP 701 accesses to the hard disc unit 80, the DVRP 701 can access directly to the hard disc unit 80 through the hard disc controller 903. However, the IOP 601 cannot access directly to the hard disc unit 80 but can access to the hard disc unit 80 by writing the command of the IOP 601 in a register provided in the hard disc controller 90, and transferring the contents of the register to the hard disc unit 80 by the DVRP 701.

The shared register 908 and the shared DMA buffer 909 are shared by the IOP 601 and the DVRP 701 for use. For example, the shared register 908 is used for informing the command in response to the user input through the graphic user interface by the IOP 601 or the command in response to the remote control signal received from the remote commander (not shown) to the DVRP 701.

Description of Operation

The essential operation of the multimedia recorder/reproducer 10 of the above-mentioned structure will be described.

Reproducing Operation for Viewing and Hearing Broadcasting Program Contents and External Input Contents When the remote commander 50 is used and viewing and hearing of the television broadcasting program contents are selectively inputted by a user, an infrared remote control signal of the selective input is sent from the remote commander 50 to the remote control signal reception processing unit 608. The remote control signal reception processing unit 608 judges the selective input, and sends the control signal of the judged result to the IOP 601 through the bus 600. The IOP 601 judges the control signal, and delivers the channel selection command to the DVRP 701 through the shared register 904.

Alternatively, when the viewing and hearing of the television broadcasting program contents are selectively inputted by the user, for example, in the graphic user interface screen displayed on the monitor display screen through the operation controller 40, the IOP 601 senses it, and delivers the channel section command to the DVRP 701 through the shared register 904.

The DVRP 701 controls the broadcasting receiver 703 to select the television broadcasting program contents in response to the channel selection command, and controls the selecting circuit 707 to select the television broadcasting program contents. The selecting circuit 707 is controlled to the state of selecting the image mixer 604 side and controlled to supply the image data of the television broadcasting program contents to the monitor display 30 through the image mixer 604. Thus, the television broadcasting program contents can be viewed and heard in the monitor display 30.

Further, when the external input contents inputted through the external input terminal 706 by the user input through the remote commander 50 and the operation controller 40 are selectively inputted, the DVRP 701 which receives the command from the IOP 601 through the shared register 904 switches the selecting circuit 704 to the external input terminal 706 side. Thus, the image data of the external contents inputted through the external input terminal 706 from the selecting circuit 707 is supplied to the image mixer 604, and the external input contents are viewed and heard in the monitor display 30.

Recording/Reproducing Operation of Broadcasting Program Contents

For example, when recording command input to the hard disc unit 80 or reproducing command input from the hard disc unit 80 is achieved through the remote commander 50 or the operation controller 40 by a user input, the IOP 601 senses it, and delivers the recording command or the reproducing command to the DVRP 701 through the shared register 904.

The DVRP 701 controls to write the compression coded data of the television broadcasting program contents from the MPEG encoder 708 from the MPEG bridge 906 to the hard disc unit 80 through the hard disc controller 903 at the time of recording the television broadcasting program contents in response to the recording command.

Also, at the time of reproducing the contents written in the hard disc unit 80 in response to the reproducing command, the DVRP 701 reads the compression coded data to be an object from the hard disc unit 80 through the hard disc controller 903, and transfers the compression coded data readout from the hard disc unit 80 to the game unit section 60 side through the shared DMA buffer 905.

The IOP 601 decodes the contents data at the game unit section 60 side, outputs the contents data to the monitor display 30 through the drawing engine 602, the display image data generation output unit 603, the image mixer 604 and the display signal conversion output unit 609, and reproduces the image.

Incidentally, when the recording instruction from the IOP 601 is recording in the DVD, its instruction command is sent to the DVRP 701 through the shared register 904, and the MPEG bridge 906 transfers the compression coded data of the television broadcasting program contents to the game unit section 60 side through the shared DMA buffer 909. The IOP 601 sends the compression coded data of the television broadcasting program contents transferred in this manner to a DVD read/write unit 606 through the DVD controller 607, and records in the DVD.

<Operation as Game Unit>

In the graphic user interface screen displayed on a monitor display screen, when the selective operation input of the game contents is performed by the user input through the remote commander 50 and the operation controller 40, the IOP 601 starts the boot ROM 605, and captures the game software through the DVD controller 607. The IOP 601 controls to generate the drawing data based on the game software in the drawing engine 602.

The drawing image data based on the game software from the drawing engine 602 is supplied to the display image data generation output unit 603. The display image data generation output unit 603 converts the drawing image data into display image data for displaying on the display 30. The display image data from the display image data generation output unit 603 is sent to the display 30 through the image mixer 604.

Also, when the instruction designated by a user is reproduced from movie contents, and the like recorded in the DVD, the decoded data of the movie contents data compression coded from the drawing engine 602 is obtained based on the control of the IOP 601, the decoded data is formed to the reproduced image data of the movie contents by the display image data generation output unit 603, and supplied to the display 30 through the image mixer 604 and the display signal conversion output unit 609.

<Screen of Graphic User Interface>

In this embodiment, the image of the above-mentioned television broadcasting program contents, the reproduced image of the DVD, the image read from the hard disc unit 80 are not mixed by the image mixer 604 as they are, but only these images are displayed. In this embodiment, when the select button 542 of the remote commander 50 or the select button 46SE of the operation controller 40 is operated, the image of the graphic user interface is superposed in a semi-transparent state on the image displayed at that time under the control of the IOP 601.

More particularly, if the select button 452 of the remote commander 50 or the select button 46SE of the operation controller 40 is pressed, when the image of the television broadcasting program contents, the reproduced image of the DVD, the image read from the hard disc unit 80 are displayed. The IOP 601 sends a control instruction for generating the image of the graphic user interface screen to the drawing engine 602.

The drawing engine 602 generates the drawing data of the graphic user interface screen in response to the control instruction from the IOP 601. The drawing data of the graphic user interface screen generated from the drawing engine 602 is supplied to the display image data generation output unit 603, and the image data of the graphic user interface screen is generated. The image data of the graphic user interface screen from the display image data generation output unit 603 is sent to the image mixer 604, mixed with the image data of the television broadcasting program, etc. from the television broadcasting recorder section 70 by α blending, and the graphic user interface screen is displayed by superposing the image of the television broadcasting program in a semi-transparent state on the screen of the monitor display 30.

Figure 4:
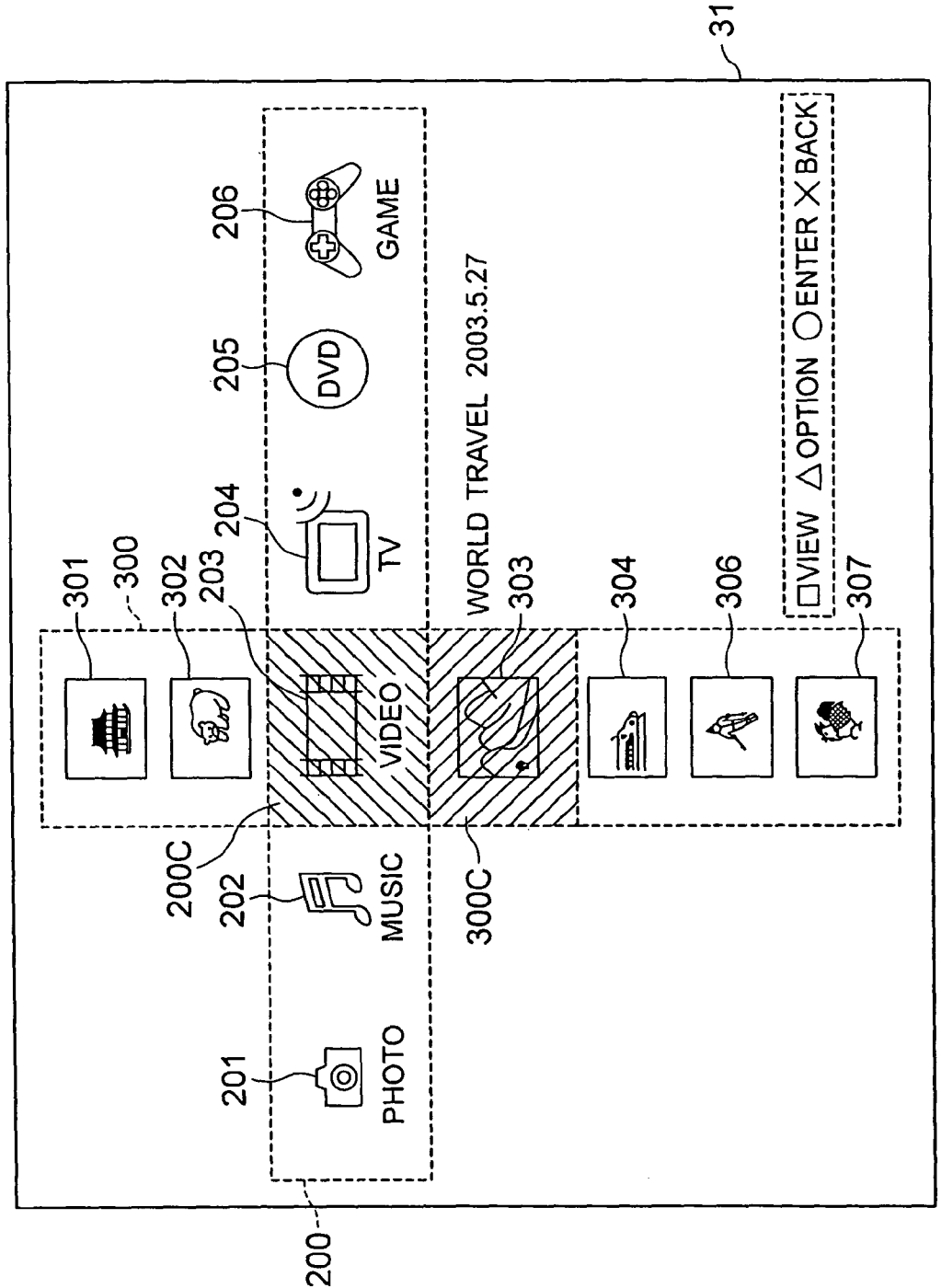
FIG. 4 is a view showing an example of a display screen of the composite apparatus according to an embodiment of the present invention.

FIG. 4 shows an example of an initial menu screen of a user interface screen displayed on a screen 31 of a monitor display 30 by generating from a drawing engine 602 under the control of the IOP 601 in the multimedia reproducer 20. As described above, the initial menu screen of this embodiment is displayed on the screen 31 or erased from the screen 31 by operating a select button 542 of the remote commander 50 or a select button 46SE of the operation controller 40.

In this initial menu screen of this embodiment, there is displayed an intersection type two-dimensional array menu having media and set icon array 200 in which a plurality of media icons and set icons aligned in one row in a horizontal direction, a contents icon array 300 in which a plurality of contents icons aligned in one row in a vertical direction, a media set icon array 310 are intersected near the center of the screen.

Since the media icon included in the media and set icon array 200 is a small image for heading showing the type of the media reproducible by the multimedia recorder/reproducer 10 of this embodiment, the media icon is predetermined. In the example of FIG. 4, as the media icon included in the media and set icon array 200, a photographic icon 201, a music icon 202, a moving image icon 203, a broadcasting icon 204, an optical disc icon 205 and a game icon 206 are displayed.

Figure 5:
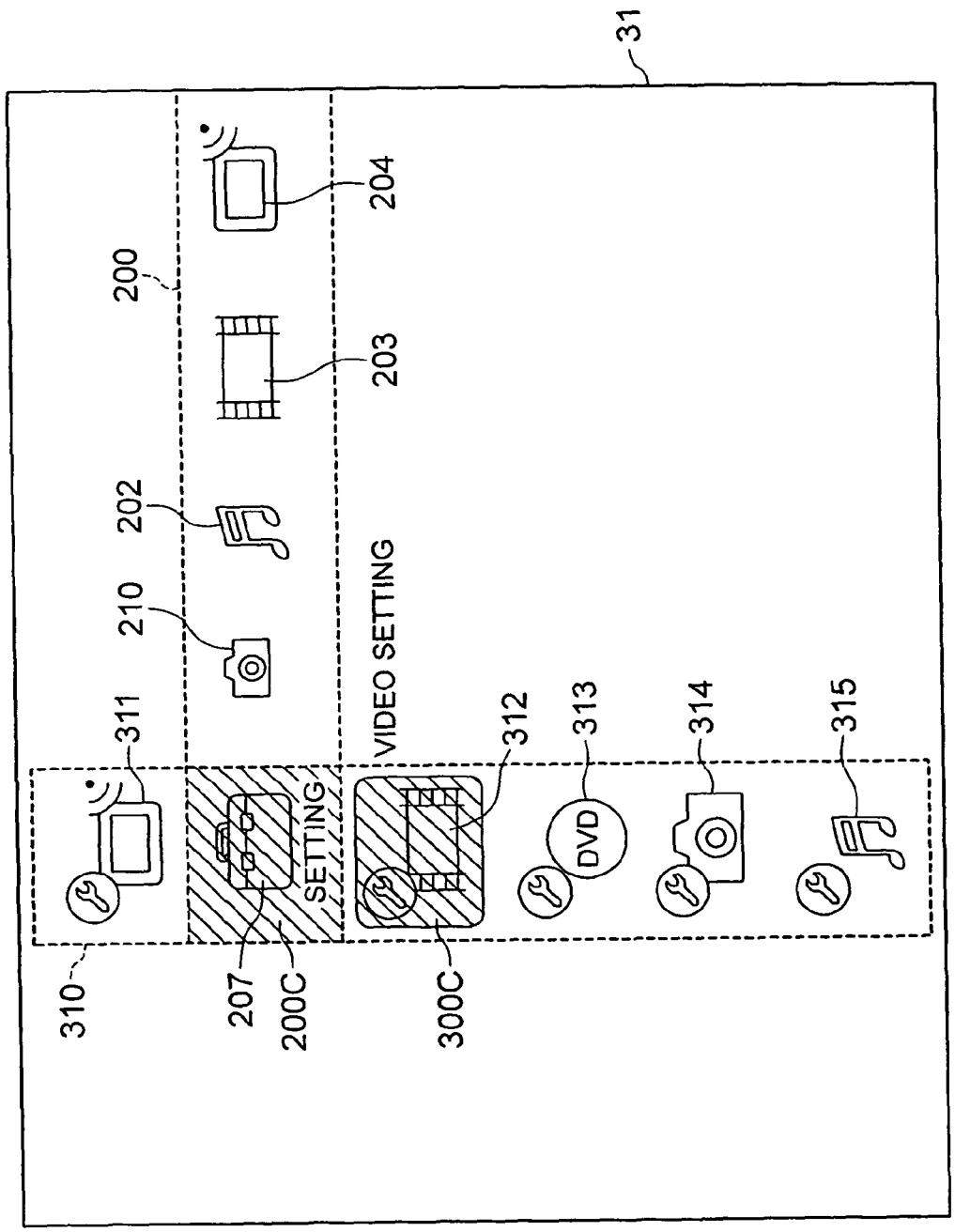
FIG. 5 is a view showing an example of a display screen of the composite apparatus according to an embodiment of the present invention.

Though not shown in FIG. 4, a set icon 207 is included in the media and set icon array 200. This set icon 207 can be displayed on a monitor display screen 31 as shown in FIG. 5, by moving the media and set icon array 200, for example, in a leftward direction by using the operation button 535 of the remote commander 50 and the cross type direction indication button 45 of the operation controller 40.

In the media and set icon array 200, when any media icon is selected, as shown in FIG. 4, the contents icon array 300 extended vertically from the media icon (shown by a shaded part in FIG. 4) during selecting are displayed.

The contents icon included in the contents icon array 300 is a small image for heading for a plurality of contents in the media (media during selecting, hereinafter the selecting media is referred to as noted media) of the position where the contents icon array 300 intersects the media icon array 200. The contents icons are, as described above, a thumb-nail having a compressed image of an image, a character, a design, etc. The thumb-nail is previously generated, for example, by the IOP 601, stored in the hard disc unit 80, and read from the hard disc unit 80 by the IOP 610, and used.

In the example in FIG. 4, the noted media is media shown by moving image icon 203. The moving image icon 203 corresponds to the hard disc unit 80 as media. Therefore, in the example in FIG. 4, the contents icon included in the contents icon array 300 are icons of the contents recorded in the hard disc unit 80. In this example, in the contents icon array 300, contents icons 301 to 307 are displayed on one screen.

In the media and set icon array 200, when the set icon 207 is selected (shown by shaded part in FIG. 5), as shown in FIG. 5, the media set icon array 310 extended vertically from the set icon 207 during selecting is displayed. The media set icon array 310 has a plurality of media set icons 311, 312, 313, 314, 315, and 316 for setting the media selected from the media icons 201, 202, 203, 204, 205 and 206.

As shown in FIG. 5, picture symbols of the media set icons 311 to 316 are obtained by adding marks for expressing a spanner as a tool to left shoulder of the picture symbol of the corresponding media icons 201 to 206 to be easily identified by the user which icon for setting any media.

In this embodiment, as described above, in the same selected hierarchy as selecting the media, an initial menu is constructed so as to set in each media. In the composite apparatus having processing functions of a plurality of media, after each media is selected, it is general to realize setting of the selected media. In this embodiment, the menu display adopts a cross intersection type menu display as shown in FIG. 4 and FIG. 5, and "setting" is added to the same row as the menu item of media selection, and hence before selecting the media, setting of the media desired to be selected can be previously performed.

The above-mentioned graphic user interface screen is displayed by superposing in a semi-transparent state on the front surface of the image of the video contents projected on the screen 31, as will be described later.

In this example, the media and set icon array 200 is, for example, displayed fixedly at slightly above the center of the vertical direction as shown in FIG. 4 and FIG. 5 without moving in the vertical direction. However, a plurality of media icons 201 to 206 and the set icon 207 in the media and set icon array 200 are, as an entire array, moved in a lateral direction in response to the designation of the user through the cross type direction indication button 45 of the operation controller 40 and the operation button 535 of the remote commander 50.

Also, the contents icon array 300 and the media set icon array 310 are not moved in a horizontal direction, but are fixed to a slightly left side position from the center in the horizontal direction, as shown, for example, in FIG. 4 and FIG. 5, and displayed. However, a plurality of contents icons 301 to 306 and the media set icons 311 to 316 in the contents icon array 300 and the media set icon array 310 are moved, as its entire array, in a vertical direction in response to the designation of the user through the cross type direction indication button 45 of the operation controller 40 and the operation button 535 of the remote commander 50.

As described above, the display position of the vertical direction of the media and set icon array 200 in which a plurality of media icons 201 to 206 and set icon 207 are arrayed in one row in a horizontal direction, and the display position of the contents icon array 300 in which a plurality of contents icons 301 to 306 and the media set icons 311 to 316 are arrayed in one row in a vertical direction and the media set icon array 310 in a horizontal direction are fixed. Accordingly, an intersecting area 200C of the contents icon array 300 or the media set icon array 310 is fixed to the position obliquely upward left from the center of the display screen 31.

In this embodiment, the IOP 601 recognizes the media icon or the set icon 207 displayed on this intersection area 200C as icon (noted media, etc. icon) during selecting.

The noted media, and the like icon disposed at this intersection area 200C is, in this example, displayed in a color different from the other media icon or the set icon, its transparency is lowered, and highlight displayed so as to be able to be distinguished from the other icon. In the example in FIG. 4, in the intersection area 200C, the moving image icon 203 is displayed in different color from the other media icon and the set icon, the transparency of the icon 203 is lowered, and indicated to be during selecting. Incidentally, the icon during selecting may be enlarged and displayed to be highlighted.

In this embodiment, the IOP 601 recognizes that the contents icon or media set icon displayed on the area 300C right under the intersection area 200C as the contents icon (noted contents icon) during selecting or the media set icon (noted media set icon) during selecting. In order that the noted contents icon or the noted media set icon displayed on this area 300C may be distinguished from the other contents icon or the other media set icon, in this example, the noted contents icon or the noted media set icon is displayed in different state from the other contents icon or the other media set icon, and its transparency is lowered. The icon during selecting may be enlarged and displayed in a highlighted manner.

As described above, in this embodiment, the icon displayed on the intersection area 200C of the fixed position is set as the noted media, and like icon, and the contents icon and the media set icon displayed on the area (hereinafter referred to as a noted area) 300C right under the intersection area 200C are set as the noted contents icon or the noted media set icon. The user scrolls the media icon array 200 in a horizontal direction to display the media icon or the set icon corresponding to the desired media in the intersection area 200C, the contents icon array 300 and the media set icon array are scrolled in a vertical direction, and the media set icon of the media desired to be set the contents icon corresponding to the desired contents is displayed in the fixed area 300C, and the desired media set to the contents icon corresponding to the desired contents are displayed to select setting of desired contents of the desired media and the desired media are set.

At this time, when any media icon is fixed in position at the intersection area 200C, the color, the size and the transparency of the media icon are changed and displayed in a highlighted manner. In this manner, since the media icon disposed in the intersection area 200C is displayed in a display state different from the other media icon, the user can easily select the media.

When any media icon is fixed in position at the intersection area 200C, the contents icon array 300 is spread and displayed to be fed in a vertical direction from the intersection area 200C.

Then, the user moves the entire array of the contents icon by the instruction in the vertical direction through the cross type direction indication button 45 of the operation controller 40 and the operation button 535 of the remote commander 50. Then, the color, the icon size and the transparency of the contents icon disposed in the noted area 300C right under the intersection area 200C are changed under the control of the IOP 601. Incidentally, near the noted contents icon, i.e., in the example shown in FIG. 4, at the right side of the noted contents icon, for example, the video title and recording date are displayed under the control of the IOP 601 as an attribute concerning the contents corresponding to the noted contents icon. Incidentally, near the noted media set icon, i.e., in the example shown in FIG. 5, at the right side of the noted media set icon, a name of setting the media corresponding to the noted media set icon, for example, "video setting" is displayed under the control of the IOP 601, in the example shown in FIG. 5.

Further, under the control of the IOP 601, when the set icon 207 is fixed in position at the intersecting area 200C, the color, the size and the transparency of the set icon 207 are changed and displayed in a highlighted manner. In this manner, since the set icon disposed in the intersection area 200C is displayed in a display state different from the other media icon, the user can easily select "setting".

When the set icon 207 is fixed in position at the intersecting area 200C, as shown in FIG. 5, under the control of the IOP 601 the media set icon array 310 is spread and displayed to be fed in a vertical direction from the intersection area 200C.

Then the user moved the entire array of the contents icon by the instruction in the vertical direction through the operation button 535 of the remote commander 50 and the cross type direction indication button 45 of the operation controller 40. Then, the color, the icon size and the transparency of the media set icon disposed in the noted area 300C right under the intersection area 200C are changed under the control of the IOP 601.

Setting of Switching of Remote Controlling Function

Figure 6:
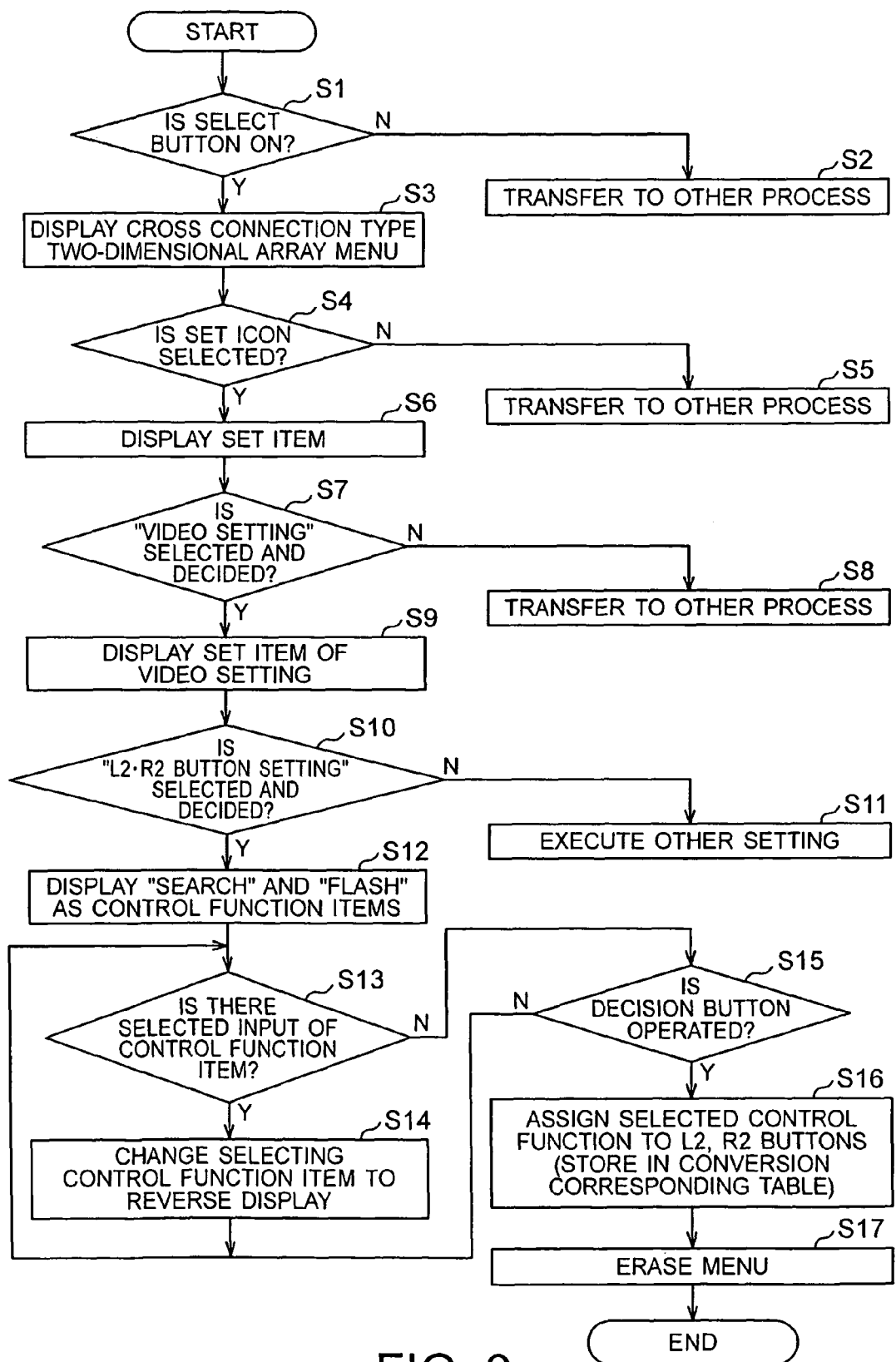
FIG. 6 is a flowchart for explaining the operation of an essential part of an embodiment of the present invention.

FIG. 6 shows a flowchart of processing when a remote controlling function assigned to the L2 operation button 48L and the R2 operation button 48R of the operation controller 40 and the L2 operation button 545 and the R2 operation button 546 of the remote commander 50 is switched and set. This process is executed by the remote control signal reception processing unit 608 and the IOP 601.

As the operating means at this time, either the operation controller 40 or the remote commander 50 may be used. In FIG. 6, as one example, the remote commander 50 is used as the operating means. As described above, the remote control signal reception processing unit 608 refers to the remote control conversion correspondence table of the built-in memory, judges by which operation buttons operate the infrared remote control signal received from the remote commander 50 is and generates the control signal based on the judged result.

First, the remote control signal reception processing unit 608 judges whether the select button 542 of the remote commander 50 is pressed or not (step S1). When the remote control signal reception processing unit 608 judges that the select button 542 is not pressed, the operation is transferred to the other process (step S2).

When the remote control signal reception processing unit 608 judges that the select button 542 is pressed in step S1, the unit 608 sends a control instruction signal for requesting to display a cross type two-dimensional array menu to the IOP 601 through the bus 600. The IOP 601, when receiving the control instruction signal, controls to display the cross type two-dimensional array menu as shown in FIG. 4 on the screen 31 of the monitor display 30 (step S3).

Then, the remote control signal reception processing unit 608, when receiving a lateral direction operation signal for selecting any icon of the media and set icon array 200 by the operation button 35, sends the operation signal to the IOP 601. The IOP 601 receives the lateral direction operation signal, and judges whether the set icon 207 is selected or not (step S4).

When it is judged that the media icon other than the set icon 207 is selected, the IOP 601 transfers to a routine for processing in response to the media corresponding to the selected media icon (step S5).

When it is judged that the set icon 207 is selected at step S4, as shown in FIG. 5, the IOP 601 vertically extends the media set icon array 310 from the set icon 207 to be displayed on the screen 31 of the monitor display 30 (step S6).

At this time, as described above, the media set icon displayed in the area 300C disposed right under the set icon 207 is the noted media set icon. In FIG. 5, the noted media set icon is surrounded by a thick line. At the right side of the noted media set icon, set media corresponding to the noted media set icon is displayed in characters. In the example of FIG. 5, characters of "video setting" showing that the setting of the noted media is selected is displayed.

Next, when receiving the vertical direction operation signal for selecting any icon of the media set icon array 310 by way of the operation button 535, the remote control signal reception processing unit 608 sends the operation signal to the IOP 601. The IOP 601 receives the vertical direction operation signal and judges whether the "video setting" is selected or not (step S7).

When it is judged that the "video setting" is not selected at step S7, the IOP 601 transfers to a process routine for setting the selected other setting other than the "video setting" (step S8).

Figure 7:
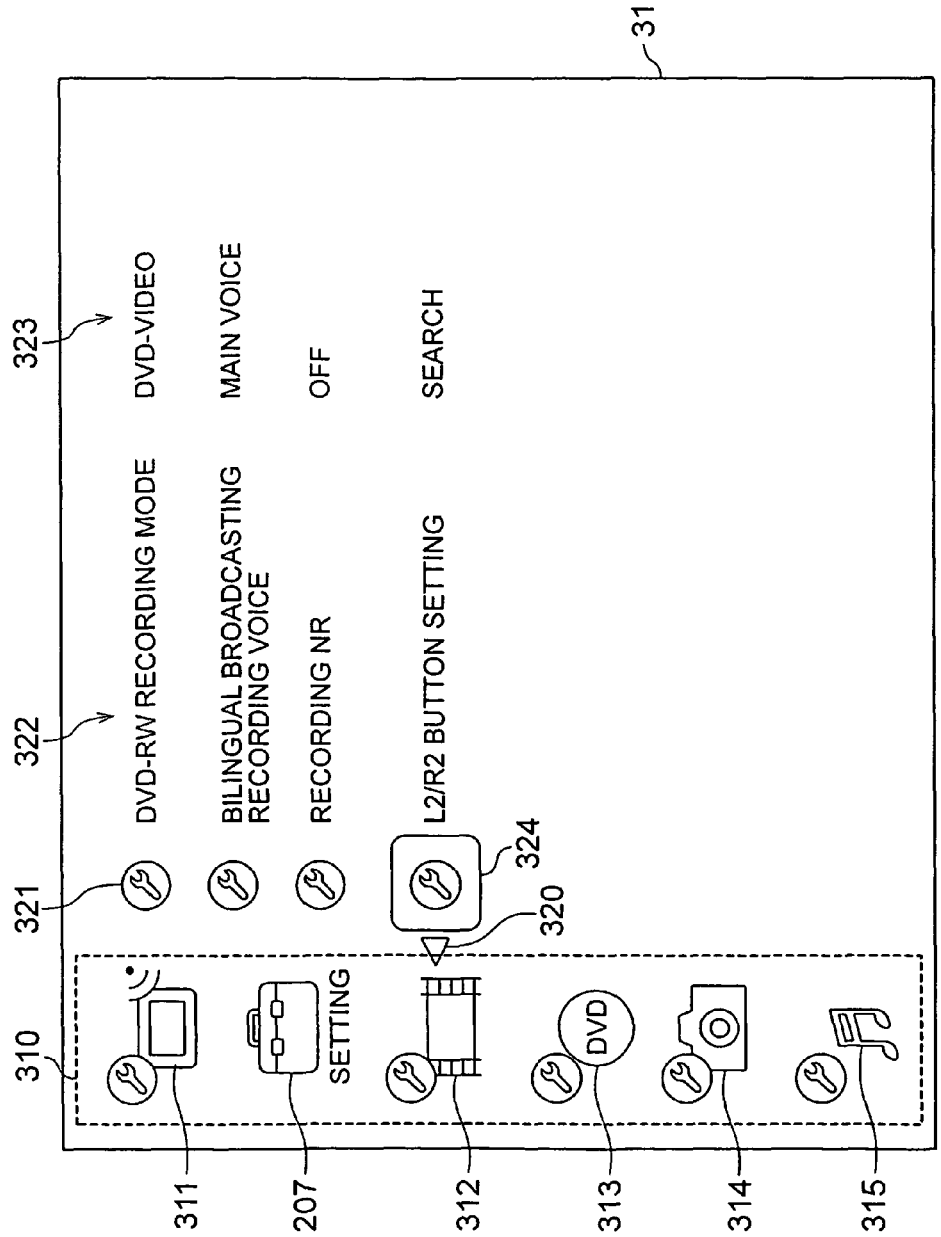
FIG. 7 is a view showing an example of the display screen of the composite apparatus according to an embodiment of the present invention.

When it is judged that the "video setting" is selected at step S7, the IOP 601 changes the display of the screen 31 of the monitor display 30 to the screen display of set item of video setting from the state shown in FIG. 5 to the state shown in FIG. 7 (step S9). In this screen of the set item of the video setting, a plurality of set items are sequentially displayed in a longitudinal direction in parallel with the media set icon array 310 under the control of the IOP 601, and a coupling mark 320 showing that these set items are the set item related to the video set icon 312 is displayed at the right side of the video set icon 312.

As shown in FIG. 7, each set item displays a mark 321 for expressing a spanner as a tool indicating the set item, and a character row 322 for explaining the set item at the right side of the mark 321. Further, character rows 323 showing the presently selected state, the mode and the controlling function are displayed at the further right side of the character rows 322 for explaining the set items.

As one of the set items of this "video setting", "L2•R2 button setting" is provided. Incidentally, in the example in FIG. 7, in the "L2•R2 button setting", "searching" is described in the character row 323, at present, searching control function is assigned to the L2 operation button 58L, the R2 operation button 546 and the L2 operation button 545 of the remote commander 50, the R2 operation button 546 of the operation controller 40.

Next, when receiving the vertical direction operation signal for selecting any of the set items by way of the operation button 535, the remote control signal reception processing unit 608 sends the operation signal to the IOP 601. The IOP 601 receives the vertical direction operation signal and judges whether the "L2•R2 button setting" is selected or not as the set item (step S10). In FIG. 7, a square frame 324 shows what is the set item selected at present. When a decision key is operated at the position of the set item surrounded by the square frame 324, it means that the set item in this square frame 324 is selected and decided.

When it is judged that the "L2•R2 button setting" is not selectively decided at step S10, the IOP 601 transfers to the process routine for the selected and decided set item other than the "L2•R2 button setting" (step S11).

Figure 8:
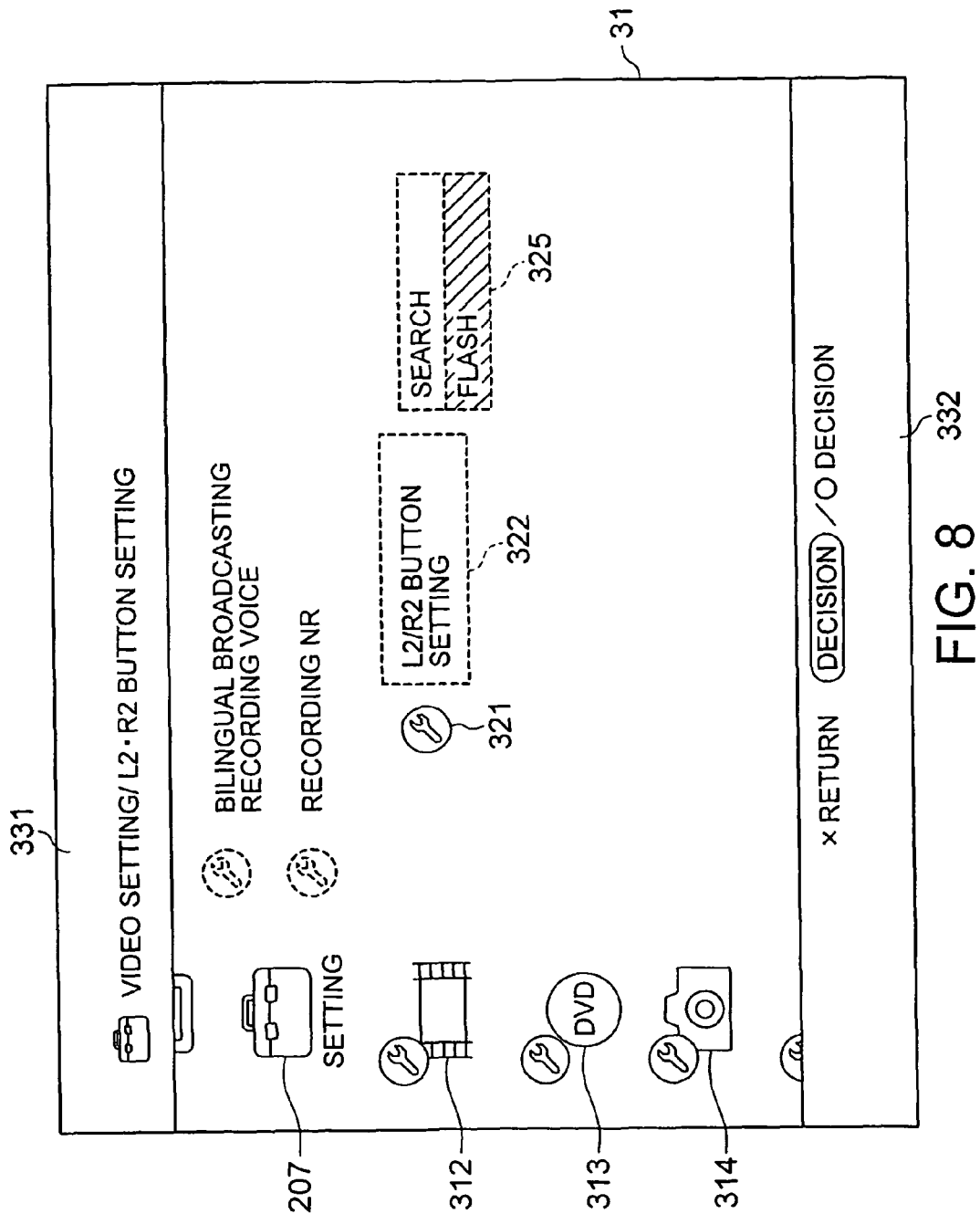
FIG. 8 is a view showing an example of the display screen of the composite apparatus according to an embodiment of the present invention.

When it is judged that the "L2•R2 button setting" is selected and decided at step S10, the IOP 601 changes the graphic user interface screen on the screen 31 of the monitor display 30 from the screen display state shown in FIG. 7 to the selected set screen display for the set item of the "L2•R2 button setting" shown in FIG. 8 (step S12).

More particularly, in the selected set screen display of the set item of the "L2•R2 button setting" as shown in FIG. 8, the character row 322 and the mark 321 of the selected and decided set item of the "L2•R2 button setting" are moved to the right side in the horizontal direction, and the mark 321 and the character row 322 of the other set item are displayed as display density decreased for the user to visually distinct the selection or non-selection of the set item.

The "searching" and "flashing" are displayed as a display character row 325 of selectively settable controlling function items at the right side of the character row 322 of the set item of the "L2•R2 button setting" of FIG. 8. At this time, the controlling function item that is being selected at present (the controlling function item assigned at present) is informed to a user by reverse display, for example. At the same time, the set screen display of the "L2•R2 button setting" in the video setting of the screen display is indicated at the upper side 331 of the screen 31, and a decision button of selectively settable controlling function items and a button for returning to the previous screen are displayed with a symbol indicating to which buttons correspond to the operation buttons of the remote commander 50 and the operation controller 40.

The user selects either one of the two controlling function items of the "searching" or "flashing" by operating in a vertical direction by way of the operation button 535 of the remote commander 50, and the operation button 532 is pressed as the decision button when the selected controlling function item is decided to be assigned to the L2•R2 buttons 48L, 48R and 545, 546.

When the remote control signal reception processing unit 608 receives a vertical direction operation signal for selecting either of the controlling function items by way of the operation button 535, the unit 608 sends the operation signal to the IOP 601. The IOP 601 judges whether the controlling function item is selectively inputted or not according to whether the IOP 601 receives the vertical direction operation signal or not (step S13). When the IOP 601 judges that the controlling function item is selectively input, the IOP 601 reversely displays the selected controlling function item to indicate the selected state (step S14).

In step S13, when it is judged that the controlling function item is not selectively inputted, the IOP 601 in this example, judges whether the decision button is operated or not (step S15) according to whether the signal indicating the operation of the decision button is received from the remote control signal reception processing unit 608, and returns to step S13 when the IOP 601 judges that the decision button is not operated.

In step S15, when the IOP 601 judges that the decision button is operated, the IOP 601 sends controlling function set information indicating that either one of the two controlling function items of the "searching" and "flashing" is set, to the remote control signal reception processing unit 608. The remote control signal reception processing unit 608 receives this controlling function set information and updates the contents of the remote control conversion correspondence table for the recorder/reproducer mode to assign the selectively set function as the controlling function of the L2•R2 buttons 545, 546 of the remote control conversion correspondence table (step S16). In this step S16, the IOP 601 similarly updates to assign the selectively set function to the contents of the conversion correspondence table for the built-in operation controller 40 as the controlling function of the L2•R2 buttons 48L, 48R of the conversion correspondence table for the recorder/reproducer mode.

Then, the IOP 601 erases the menu displayed on the screen 31, and returns to the state of the original screen display before the menu display (step S17). In the foregoing description, this processing routine is ended.

Reception Process of Remote Control Signal

As described above, the controlling function assigned to the L2 operation button 545 and the R2 operation button 546 of the remote commander 50 is changed according to the update of the contents of the remote control conversion correspondence table of the built-in memory in the remote control signal reception processing unit 608 by setting. That is, when the remote control signal reception processing unit 608 receives the infrared remote control signal from the remote commander 50, it refers to the remote control conversion correspondence table and identifies the control corresponding to the remote control signal, the control function assigned to the operation button can be changed by updating the contents of the remote control conversion correspondence table.

Figure 9:
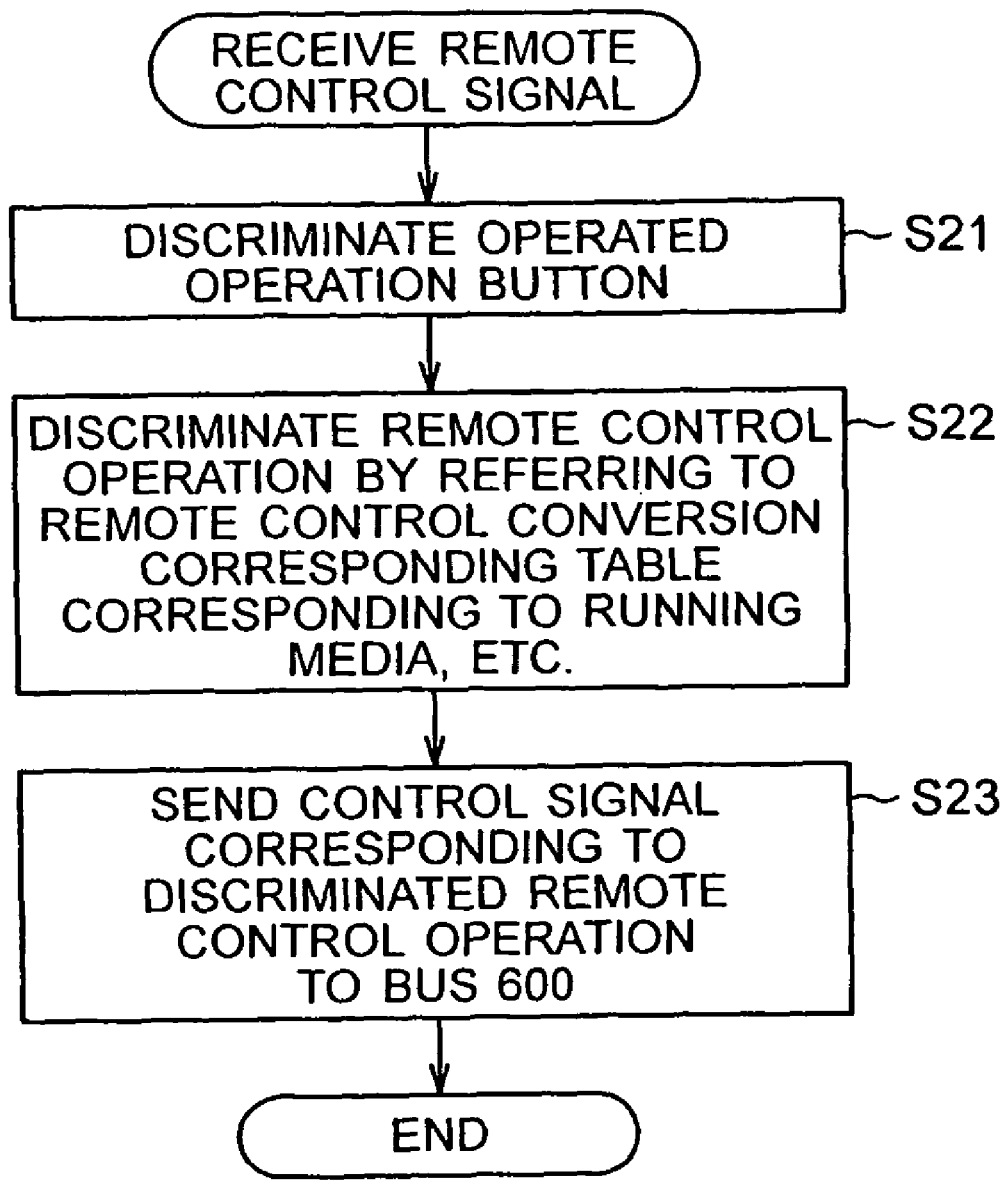
FIG. 9 is a flowchart for explaining the operation of an embodiment of the present invention.

FIG. 9 is a flowchart of the operation when receiving the infrared remote control signal from the remote commander 50 in the remote control signal reception processing unit 608.

More particularly, when the remote control signal reception processing unit 608 receives the infrared remote control signal from the remote commander 50, it starts a processing routine of FIG. 9, and discriminates which is the operated operation button (step S21). Then, the multimedia recorder/reproducer 10 refers to the remote control conversion correspondence table corresponding to the running media, and the like (broadcasting reception, DVD reproduction, hard disc reproduction, menu displaying, and the like), and judges the controlling function corresponding to the operated operation button (step S22).

The remote control signal reception processing unit 608 generates a control signal corresponding to the judged controlling function, and sends the control signal to the bus 600 (step S23). The remote control signal receiving process is ended here.

Therefore, when the "searching" is assigned as the controlling function at the time of the reproducing mode to the L2 operation button 545 and the R2 operation button 546 of the remote commander 50, and if the L2 operation button 545 or the R2 operation button 546 is operated by the user in case that the multimedia recorder/reproducer 10 is in a reproducing mode, the remote control signal reception processing unit 608 outputs the control signal of a rewinding search or fast forward search to the bus 600.

At the contents reproducing time of the hard disc unit 80, the hard disc controller 903 performs the control in response to the control signal of the search, and at the DVD reproducing time, the DVD controller 607 performs the control in response to the control signal of the search.

Figure 10A:
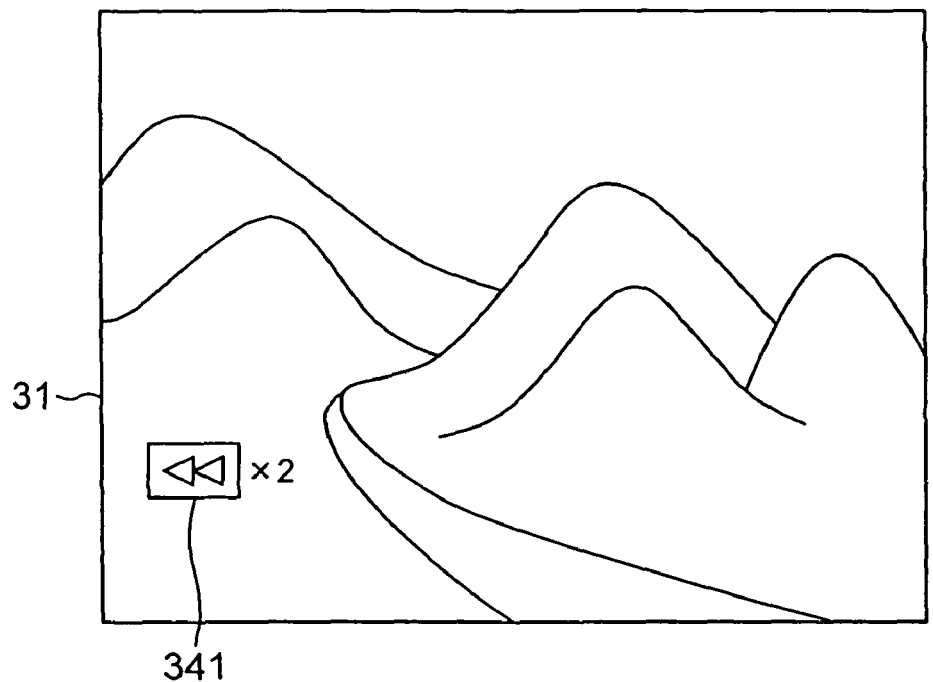
FIGS. 10A to 10B are views showing an example of the display screen of the composite apparatus according to an embodiment of the present invention.
Figure 10B:
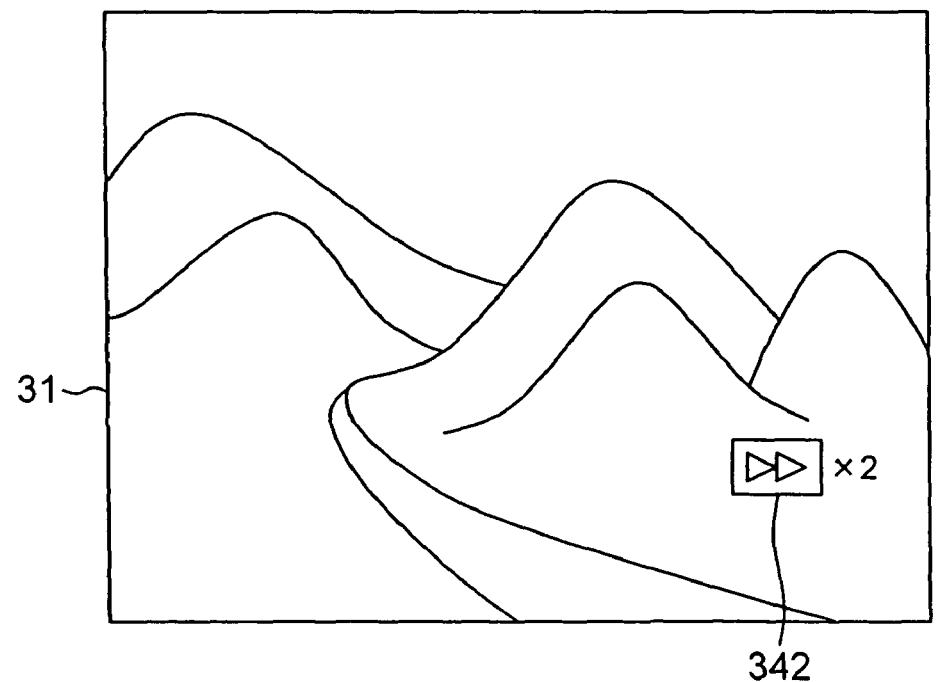

At this time, as shown in FIGS. 10A and 10B, a mark 341 or a mark 342 indicating that the operation of the L2 operation button 545 or the R2 operation button 546 is a rewinding searching or fast forward searching, is displayed on the screen 31.

Incidentally, in this example, when the L2 operation button 545 or the R2 operation button 546 is operated one time, the multimedia recorder/reproducer 10 can be controlled to be operated at double speed. When operated twice, the multimedia recorder/reproducer 10 can be controlled to be operated at ten times speed. When operated three times, the multimedia recorder/reproducer 10 can be controlled to be operated at thirty times speed. Thus, the numbers of multiple speed are displayed on the screen at the right side of the marks 341, 342. In FIG. 10, "×2" displayed at right side of the marks 341, 342 means double speed searching.

Then, when the "flashing" is assigned as the controlling function at the time of reproducing mode to the L2 operation button 545 and the R2 operation button 546 of the remote commander 50, and if the L2 operation button 545 or the R2 operation button 546 is operated by the user in case that the multimedia recorder/reproducer 10 is in a reproducing mode, the remote control signal reception processing unit 608 outputs a control signal of flashing to jump to the reproducing position before or after (13+15(n−1)) sec. in response to the number of times n the L2 operation button 545 or the R2 operation button 546 is operated, as described above.

At the contents reproducing time of the hard disc drive unit 80, the hard disc controller 903 performs the control in response to the control signal of the flashing, and at the DVD reproducing time, the DVD controller 607 performs the control in response to the control signal of the flashing.

Figure 11A:
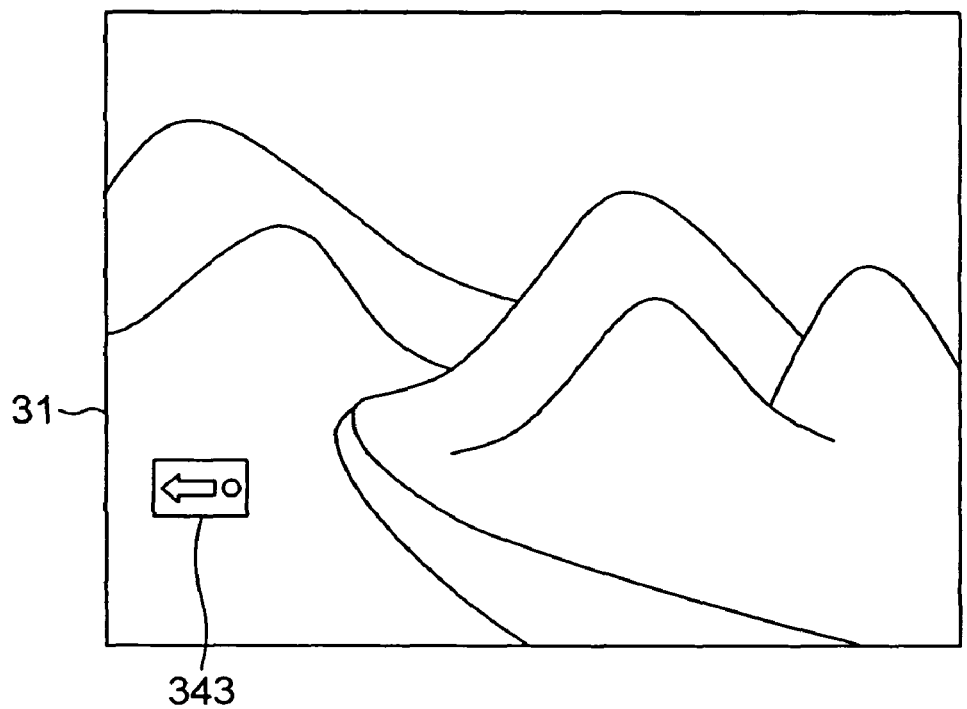
FIGS. 11A to 11B are views showing an example of the display screen of the composite apparatus according to an embodiment of the present invention.
Figure 11B:
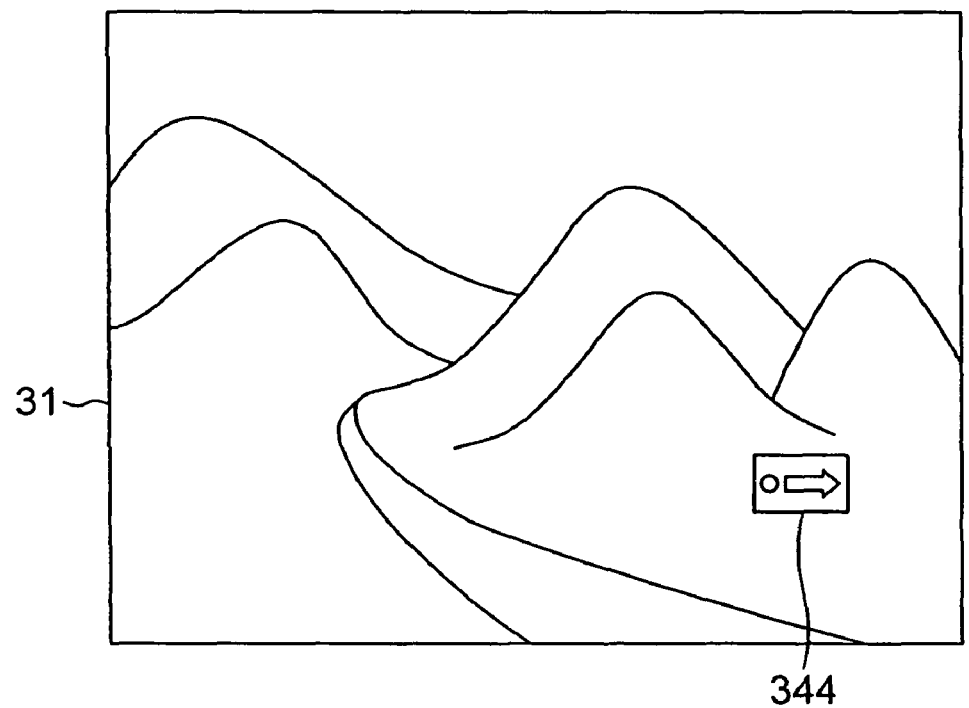

At this time, as shown in FIGS. 11A and 11B, a mark 343 or a mark 344 indicating that the operation of the L2 operation button 545 or the R2 operation button 546 is flashing of rewinding direction or flashing of fast forward direction, is displayed on the screen 31.

Incidentally, though not shown in FIG. 11, the number of seconds of jumping may be displayed on the screen at the right side of the mark 343, 344.

Thus, even when the "flashing" is assigned as the controlling function at the time of the reproducing mode to the L2 operation button 545 and the R2 operation button 546 of the remote commander 50, in this embodiment, as described above, since the controlling function of the searching is assigned to the operation button 535 of the remote commander 50, it does not become impossible to use the controlling function of searching.

In the foregoing description, the case that the input of setting change of the controlling function assigned to the L2, R2 operation buttons is achieved from the remote commander 50 has been described. The case that the input of setting change of the controlling function assigned to the L2, R2 operation buttons by using the operation controller 40 is substantially the same.

However, when the setting change of the controlling function of the operation button is performed via a menu display as described above by using the operation controller 40, in the case of this embodiment, information of setting functions of the L2 operation button 545 and the R2 operation button 546 is sent from the IOP 601 to the remote control signal reception processing unit 608, and the unit 608 updates the remote control conversion correspondence table for recorder/reproducer mode. In this case, the IOP 601 updates the conversion corresponding table for the recorder/reproducer mode by updating the setting function of the L2 operation button 48L and the R2 operation button 48R of the operation controller 40.

Incidentally, the controlling function of both the L2 operation button and the R2 operation button of the remote commander 50 and the operation controller 40 can be set merely by setting the controlling function of the L2 operation button and the R2 operation button by using either one of the remote commander 50 or the operation controller 40.

Incidentally, in the above-mentioned embodiment, in the remote control signal reception processing unit 608, as the remote control conversion correspondence table, for a game unit mode, and for recorder/reproducer mode, are provided and switched in response to the present mode. However, the remote control signal reception processing unit 608 is set to judge whether the operation button is pressed or not and to send the operation button information (identification information of which operation button is used) of its judged result to the IOP 601, and the IOP 601 may generate the control signal in response to the received operation button information, in response to the present mode.

In this case, the remote control conversion correspondence table is not necessarily to be provided in the remote control signal reception processing unit 608. It is sufficient if the IOP 601 comprises the remote control conversion correspondence table and only the IOP 601 performs the updating of the assigned controlling function.

It is needless to say that the composite apparatus according to the present invention is not limited to the above-mentioned multimedia recorder/reproducer, and the composite function is not limited to the function of the game unit nor the function of the recorder/reproducer.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A composite apparatus comprising:
   a first function device section;
   a second function device section; and
   a remote controller section for remotely controlling the first function device section and the second function device section, wherein
   the remote controller section has a first operation button group for remotely controlling the first function device section, and a second operation button group for remotely controlling the second function device section,
   a first operation button of the first operation button group has a specific controlling function for remotely controlling the first function device section and also has an assigned controlling function for remotely controlling the second function device, wherein the assigned controlling function of the first operation button is double assigned to a second operation button of the second operation button group, and
   the assigned controlling function of the first operation button for remotely controlling the second function device is changeable to an other controlling function.

2. The composite apparatus according to claim 1, wherein the first function device section is a game unit section, and wherein the second function device section is a reproducer section for reading and reproducing data stored in a storage medium.

3. The composite apparatus according to claim 2, wherein the assigned controlling function that is double assigned is a search reproducing function, and wherein the other controlling function is a function of jumping a reproducing position to a predetermined time after or to a predetermined time before.

4. The composite apparatus according to claim 1, further comprising:
   an operation button function change accepting means for displaying a screen for changing the assigned controlling function of the first operation button in response to an operation of a user through the remote controller section, wherein a setting change input of the user is accepted through the remote controller section and the assigned controlling function of the first button is changed to the other controlling function according to the setting change input.

5. The composite apparatus according to claim 4, wherein the operation button function change accepting means includes:
   display means of a menu display screen for sequentially aligning at least a picture symbol indicating the first function device section, a picture symbol indicating the second function device section and a picture symbol indicating a setting function selectable by the remote controller section in a first direction of a display screen and aligning at least one item provided by a device or a function indicated by a selected picture symbol in a second direction intersecting with the first direction from the selected picture symbol,
   selective input accepting means for accepting a selective input of a specific item of the at least one item aligned in the second direction in a state that the picture symbol indicating the setting function is selected on the menu display screen through the remote controller section,
   set item list display means for displaying a list of set items of the second function device section including a function change item of the first operation button when the specific item of the second function device section is selected in the selective input accepting means,
   display means for displaying a plurality of controlling functions for the first operation button, including the assigned controlling function and the other controlling function, when the function change item of the first operation button displayed by the set item list display means is selected, wherein the selective input accepting means accepts a selected input of a selected controlling function of the plurality of controlling functions, and storage means for storing the selected controlling function as the controlling function of the first operation button, so as to judge a remote control signal to be input from the remote controller section thereafter by referring to the selected controlling function of the first operation button stored in the storage means.

6. A composite apparatus comprising:
a first function device section;
a second function device section; and
a remote controller section for remotely controlling the first function device section and the second function device section, wherein a first operation button of the remote controller section has a specific controlling function for remotely controlling the first function device section for a mode when the composite apparatus operates as the first function device section, and the first operation button has an assigned controlling function for remotely controlling the second function device section for a mode when the composite apparatus operates as the second function device section;

the assigned controlling function assigned to the first operation button is double assigned to a second operation button in an operation button group that includes the first operation button, and the assigned controlling function of the first operation button for remotely controlling the second function device is changeable to an other controlling function.

7. The composite apparatus according to claim 6, wherein the first function device section is a game unit section, wherein the second function device section is a reproducer section for reading and reproducing data stored in a storage medium, and wherein the remote controller section is an operation controller for the game unit section.

8. The composite apparatus according to claim 7, wherein the assigned controlling function that is double assigned is a search reproducing function, and the other controlling function is a function of jumping a reproducing position to a predetermined time after or to a predetermined time before.

9. The composite apparatus according to claim 6, further comprising:

an operation button function change accepting means for displaying a screen for changing the assigned controlling function of the first operation button in response to an operation of a user through the remote controller section, wherein a setting change input of the user is accepted through the remote controller section and the assigned controlling function of the first operation button is changed to the other controlling function according to the setting change input.

10. The composite apparatus according to claim 9, wherein the operation button function change accepting means includes:

display means of a menu display screen for sequentially aligning at least a picture symbol indicating the first function device section, a picture symbol indicating the second function device section and a picture symbol indicating a setting function selectable by the remote controller section in a first direction of a display screen and aligning at least one item provided by a device or a function indicated by a selected picture symbol in a second direction intersecting with the first direction from the selected picture symbol, selective input accepting means for accepting a selective input of a specific item of the at least one item aligned in the second direction in a state that the picture symbol indicating the setting function is selected on the menu display screen through the remote controller section, set item list display means for displaying a list of set items of the second function device section including a function change item of the first operation button when the specific item of the second function device section is selected in the selective input accepting means, display means for displaying a plurality of controlling functions for the first operation button, including the assigned controlling function and the other controlling function, when the function change item of the first operation button displayed by the set item list display means is selected, wherein the selective input accepting means accepts a selected input of a selected controlling function of the plurality of controlling functions, and storage means for storing the selected controlling function as the controlling function of the first operation button, so as to judge a remote control signal to be input from the remote controller section thereafter by referring to the selected controlling function of the first operation button stored in the storage means.

11. A method for changing assignment of operation button function of a remote controller section of a composite apparatus having a first function device section, and a second function device section for reading and reproducing data stored in a storage medium, and a remote controller section for remotely controlling the first function device section and the second function device section, wherein the remote controller section includes an operation button that has a function for remotely controlling the first function device section and also has a function for remotely controlling the second function device section, comprising:

displaying a menu display screen sequentially aligning at least a picture symbol indicating the first function device section, a picture symbol indicating the second function device section and a picture symbol indicating a setting function selectable by the remote controller section in a first direction of a display screen and aligning at least one item provided by a device or a function indicated by a selected picture symbol in a second direction intersecting with the first direction from the selected picture symbol, accepting a selective input of a specific item of the at least one item aligned in the second direction in a state that the picture symbol indicating the setting function is selected on the menu display screen through the remote controller section;

displaying a list of set items of the second function device section including a function change item of the operation button when the specific item of the second function device section is selected in a selective input accepting means;

displaying a plurality of controlling functions for the operation button when the function change item of the first operation button displayed by the set item list display means is selected;

accepting a selected input of a selected controlling function of the plurality of controlling functions; and storing the selected controlling function as the controlling function of the operation button, so as to judge a remote control signal to be input from the remote controller section thereafter by referring to the selected controlling function of the operation button stored in a storage means.

12. A method for changing assignment of operation button function of the remote controller section of a composite apparatus according to claim 11, wherein the first function device section is a game unit section, wherein the second function device section is a reproducer section, and wherein the plurality of controlling functions include a search reproducing function and a function of jumping a reproducing position to a predetermined time after or a predetermined time before.

* * * * *